United States Patent [19]
Hayes et al.

[11] 4,087,638
[45] May 2, 1978

[54] DTMF COMMUNICATION SYSTEM

[75] Inventors: James Christopher Hayes, Irvine; Burton Ralph Tunzi, Santa Clara, both of Calif.

[73] Assignee: Telaris Telecommunications Inc., Newport Beach, Calif.

[21] Appl. No.: 728,725

[22] Filed: Oct. 1, 1976

[51] Int. Cl.[2] .......................................... H04M 11/00
[52] U.S. Cl. ................. 179/2 E; 179/84 VF; 179/90 B; 179/90 K; 328/14; 340/365 S
[58] Field of Search ................ 179/2 E, 41 A, 84 VF, 179/90 B, 90 K; 328/14; 340/365 S

[56] References Cited
U.S. PATENT DOCUMENTS

| 3,820,028 | 6/1974 | Thomas | 179/84 VF |
|---|---|---|---|
| 3,860,765 | 1/1975 | McCabe et al. | 179/90 B |
| 3,932,709 | 1/1976 | Hoff et al. | 179/90 K |
| 3,970,801 | 7/1976 | Ross et al. | 179/41 A |
| 4,007,459 | 2/1977 | Hagelbarger | 179/90 K |

*Primary Examiner*—George G. Stellar
*Attorney, Agent, or Firm*—Fraser and Bogucki

[57] ABSTRACT

A highly flexible and economical dual tone multiple frequency (DTMF) communication system includes a data input source such as a keyboard; a repertory dialer or electronic memory; an integratable digital encoder which includes a digital sine wave synthesizer; and a transmission unit such as a radio or a connection to a standard utility telephone system. The digital encoder provides a DTMF output signal at standard telephone frequencies in response to input data and includes a predial delay circuit which allows for dial tone delay or transmitter start up after receipt of data and before generation of an output signal, a two second delay circuit providing a two second output signal which may be utilized to prevent shut down between successive number entries and to lock out noise from a microphone or to a speaker and an automatic number insertion (ANI) circuit. When enabled, the automatic number insertion circuit automatically locks out a keyboard or other data source and transmits a 4 or 8 digit number supplied by a ROM before transmitting keyboard information. The ANI number may be used for automatic dialing, as a station identifier preceeding radio transmissions or as a code key enabling access to restricted information. Additional features provide in even further operator convenience.

66 Claims, 14 Drawing Figures

DTMF TELEPHONE ENCODER SYSTEM 10

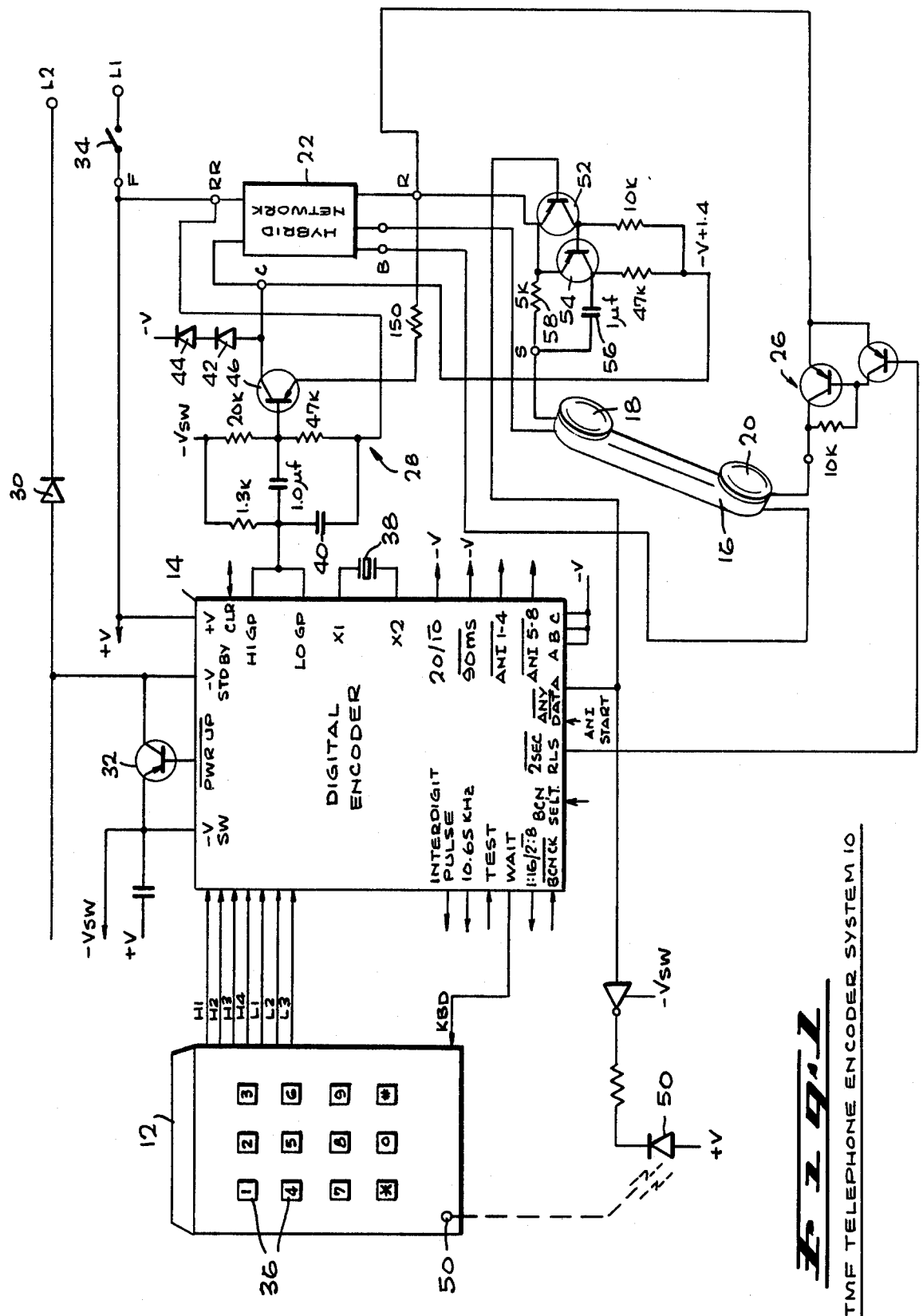

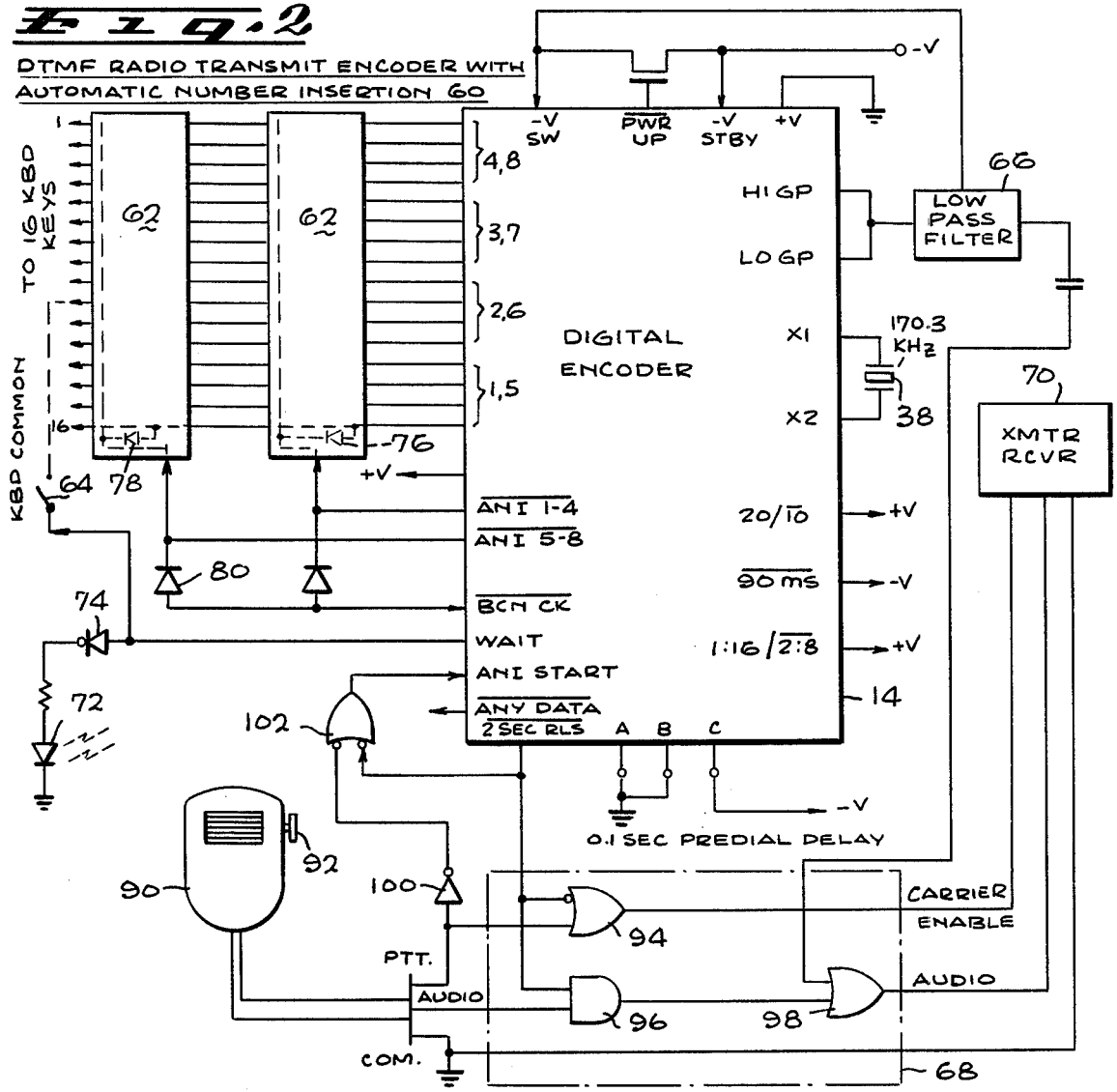

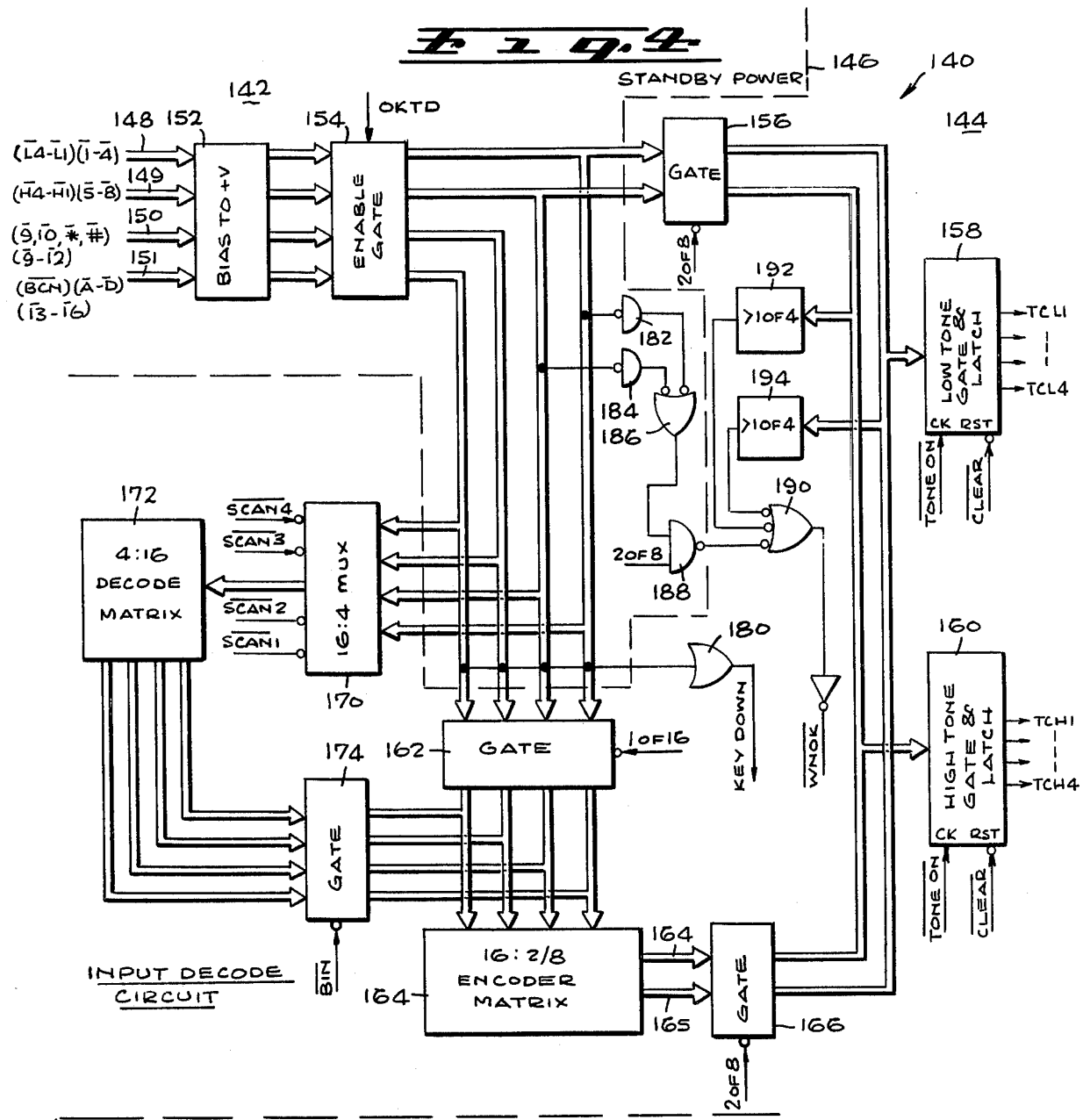
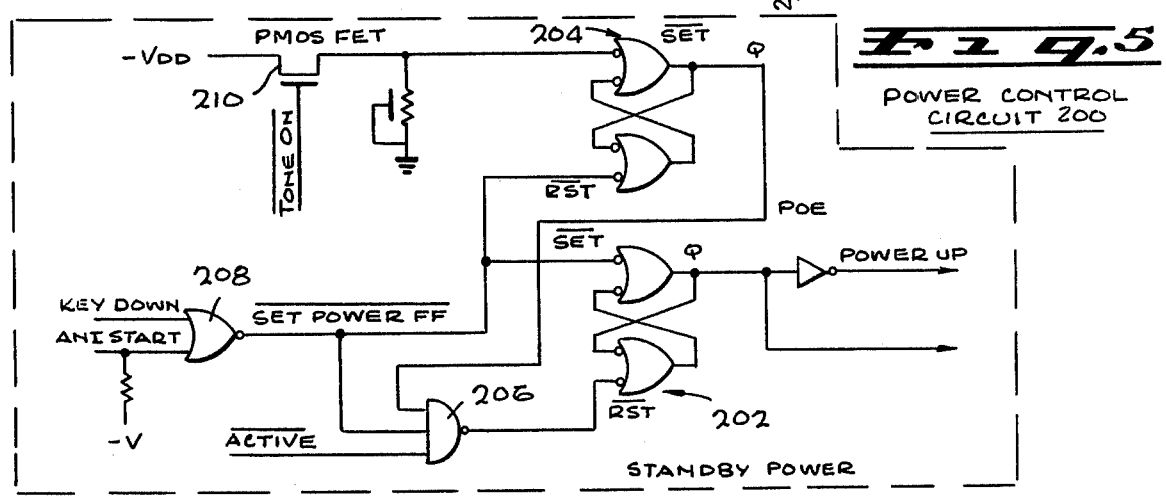

POWER ON CLEAR CIRCUIT 220

CLOCK & TIMING CIRCUIT 240

Fig. 9 ANI CIRCUITRY 300

4,087,638

DTMF COMMUNICATION SYSTEM

BACKGROUND OF THE INVENTION

1. Field of the Invention

This invention relates to a data communication system and more particularly to a system having an integrated circuit digital encoder which generates a standard telephone frequency DTMF output in response to input data.

2. Description of the Prior Art

The American utility telephone companies have developed a system of audio frequency data communication which is commonly called Touch Tone. The system provides an output signal which indicates one of 16 information states with a dual tone multiple frequency signal that combines one of four lower frequency signals with one of four higher frequency signals. Upon detection by a receiver this two of eight frequencies signal can be utilized to reconstruct the communicated data. Such systems are well known and are described inter alia in U.S. Pat. No. 3,076,059 to Meacham et al. and U.S. Pat. No. 3,128,349 to Boesch et al.

These DTMF systems typically utilize a keyboard with up to 16 keys which are decoded as one of four rows and one of four columns upon key actuation. Each row and column signal enables one of four LC tuned circuits to excite the desired two of eight output frequencies. Such systems provide adequate data communications but require expensive and complex mechanical and electrical components, are prone to failure and are much bulkier than systems according to the invention described herein. Furthermore, the prior art systems provide little in the way of flexibility or operator convenience, although a mechanical key rollover interlock may be implemented.

SUMMARY OF THE INVENTION

A dual tone multiple frequency (DTMF) communication system in accordance with the invention includes a keyboard providing keyboard information, a digital encoder circuit connected to digitally generate a DTMF output signal indicative of the keyboard information, and a communication unit coupled to transmit the DTMF output signal as a radio signal, over utility telephone lines or via some other medium.

The digital encoder may be manufactured as a single chip integrated circuit comprising P-channel metal-oxide-semiconductor field effect transistors. It includes an input decoding matrix that permits selection among four different input data formats, a digital waveform synthesizer that generates the two sine wave output signals at frequencies indicated by the input information and interface and control circuitry which controls the operation of the DTMF communication system.

The interface and control circuitry includes timing circuitry which sequences the operation of the communication system and provides both a selectable predial delay which allows for dial tone receipt delay or transmitter power up delay and a two second signal that persists after each data input to prevent turn off between key actuations and to enable muting of a system microphone and receiver. Muting of the microphone prevents external audio noise from interfering with the audio data signals and possibly being interpreted as a false data signal. The timing circuitry also provides a minimum 40 msec tone signal required by established standards even if key actuation time is shorter, a selectable 90 msec tone time to prevent a long, interrupted output signal from being received as two output signals and selection between a standard ten outputs per second telephone transmission rate and a faster 20 outputs per second transmission rate that can be decoded by some receivers.

The interface and control circuitry further includes an automatic number insertion (ANI) circuit that automatically transmits a four or eight digit number following the predial delay and before the first input data is transmitted. A "wait" signal automatically enables a keyboard or other data input device during standby, upon completion of a selected predial delay, or after an ANI operation, if any, and an ANI operation is initiated by an ANI start input signal that may be provided selectively by a data unit or radio transmit switch or automatically by any data output signal that indicates data has been supplied to the digital encoder circuit as by a key actuation.

A binary coded number (BCN) circuit is also included within the interface and control circuitry. This circuit is enabled by a BCN Select input that conditions the input decoding matrix to accept binary coded numbers on data input conductors 13-16. A BCN clock input accepts clock signals provided to initiate transmission of each binary number and an interdigit pulse facilitates synchronization with a data source by indicating the completion of generation of a selectable 40 or 90 msec tone.

To minimize power consumption the digital encoder has two power supply inputs. A standby input is normally active, but consumes very little power because it energizes only the data inputs, the ANI Start input and a small power up circuit. Upon detection of an active data input or ANI Start input, the power up circuit provides a power up signal commanding that power be switched to the switched power input to enable full system operation. The standby power consumption is only 500 microwatts and it therefore becomes practical to connect the DTMF communication system with power being derived solely from the utility telephone lines.

BRIEF DESCRIPTION OF THE DRAWINGS

A better understanding of the invention may be had from a consideration of the following detailed description taken in conjunction with the accompanying drawings in which:

FIG. 1 is a schematic and block diagram representation of a DTMF communication system in accordance with the invention configured to operate as a standard telephone encoder;

FIG. 2 is a schematic and block diagram representation of a DTMF communication system in accordance with the invention configured to operate as a radio transmit encoder with automatic number insertion;

FIG. 3 is a schematic and block diagram representation of a DTMF communication system in accordance with the invention configured to operate as a digital data communication system;

FIG. 4 is a schematic and block diagram representation of a data input circuit used in a digital decoder circuit for the systems shown in FIGS. 1-3;

FIG. 5 is a schematic representation of a power control circuit for a digital decoder circuit used in the systems shown in FIGS. 1-3;

DETAILED DESCRIPTION

Figure 6:
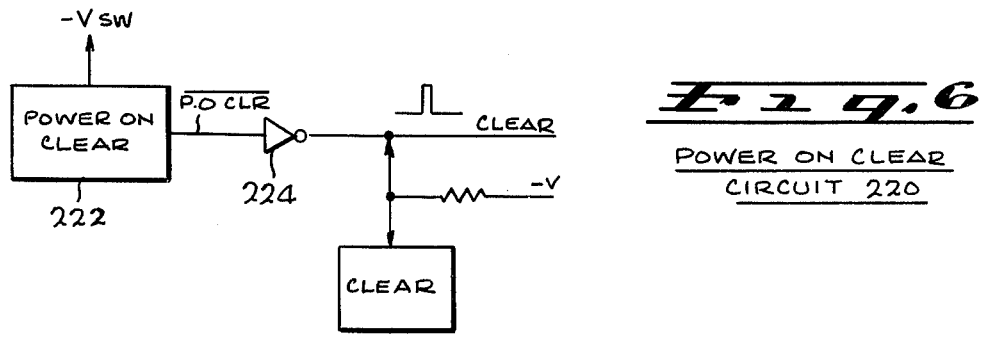
FIG. 6 is a block diagram representation of a power on clear circuit used in a digital encoder circuit of the systems shown in FIGS. 1-3.

Referring now to FIG. 1, there is shown a DTMF communication system connected to operate as a DTMF telephone encoder system for a standard utility telephone set. The system 10 includes a keyboard 12, a digital encoder 14, a hand set 16 having a speaker audio transducer 18 and a microphone audio transducer 20, and a standard telephone hybrid network 22 coupled through a receiver mute circuit 24 to speaker 18, coupled through transmitter mute circuit 26 to microphone 20, and coupled through a tone driver circuit 28 to High Group and Low Group tone outputs of encoder 14.

Digital encoder 14 is a single chip integrated circuit manufactured from selectively interconnected P-channel metal oxide semiconductor field effect transistors and is powered by connection to a negative voltage source designated V with +V being common. The digital encoder 14 has two independent power supply inputs. A −V STANDBY power input is coupled through a polarity reversal protection diode 30 to telephone utility line terminal L2 and supplies power to a portion of a key input decoding circuit, a power up circuit having an output $\overline{POWER\ UP}$, and a wait output which is connected to a common terminal of keyboard 12 and selectively enables the keyboard 12. Because only a small portion of the circuitry of digital encoder 14 receives power during standby (no tone generation) conditions, the digital encoder consumes only about 500 microwatts of power during standby and can be connected directly to the utility telephone power supply terminals without affecting telephone system operation. However, upon actuation of a key on the keyboard 12, the power up circuit senses this key actuation and responds with a $\overline{POWER\ UP}$ output signal which closes a transistor switch 32 to provide power to an input terminal −V SWITCHED which in turn energizes the remaining circuitry of digital encoder 14 to enable full operation of encoder system 10. The V+ or common terminal of digital encoder 14 is connected to standard telephone terminal F which is coupled through hook switch 34 to telephone utility line L1. The keys 36 of keyboard 12 are arranged in a matrix having rows 1-4 corresponding to high group frequencies H1-H4 respectively and columns 1-3 corresponding to low group frequencies L1-L3 respectively. High group inputs H1-H4 are connected to digital encoder data input terminals 1-4 respectively while low group signals L1-L3 are connected to low group data input terminals 5-7 respectively. Additional data input terminals 8-16 are not connected in this configuration. Actuation of one of the keys 22 connects a corresponding high group output and a corresponding low group output to a keyboard common conductor which is driven low by the WAIT output of digital encoder 14 when keyboard 12 is enabled to thereby cause an active keyboard data input to appear at two of the input terminals 1-7.

The digital encoder circuit 14 has an input terminal $1:16/\overline{2:8}$ connected to −V to cause the keyboard input signals to be decoded as standard telephone 2:8 signals. Predial delay select input terminals A B C are connected to provide a delay of zero seconds between actuation of a first key of a telephone number and initiation of data transmission over the utility telephone lines. A nonzero delay may be selected for automatic dialing applications to allow time for a dial tone to appear, but is not required in this application because a telephone user customarily waits for a dial tone before activating a key 36. A crystal 38 is connected between input terminals X1 and X2 to provide a 170.3 KHz clock signal, an input terminal $20/\overline{10}$ is connected to −V to select an optional number generation maximum rate of 10 per second which is required by utility telephone standards, and an input terminal $\overline{90\ msec}$ is connected to −V to cause data tone transmissions to be terminated 90 msec after they begin. In a standard telephone set, an output tone is generated as long as a key remains actuated. However, if an interruption should occur in the signal transmission, a long tone signal would appear as to two shorter tone signals and the telephone system central office would interpret the single long key actuation as two separate key actuations. The 90 msec option reduces the chance of this error condition occurring.

The digital encoder 14 generates two separate sine wave output signals on output terminals HI GP and LO GP which are connected together and then coupled through tone driver 28 to standard utility telephone set terminal R. Since terminal R is coupled internally of hybrid network 22 through a transformer winding to +V terminal RR and diodes 42, 44, lamp terminal C 1.4 volts above −V, a transistor 46 conducts a D.C. current between terminals R and C which is modulated by the tone signals. An output terminal $\overline{ANY\ DATA}$ is driven by an internal signal $\overline{BUSY}$ which goes low or false as soon as a key is actuated and goes high upon termination of the output tone signal for a given key. Output signal $\overline{ANY\ DATA}$ may thus be coupled through a suitable buffer 48 to an operator feedback device which may be implemented as an audible tone but in this embodiment is implemented as a light emitting diode 50 which is located within keyboard 12. Since LED 50 is coupled to the switched power supply, it consumes no power during a standby mode of operation. However, as soon as the tone for a first key is transmitted, the output signal $\overline{ANY\ DATA}$ goes low to turn on the LED 50 until a second key is actuated. LED 50 thus operates after actuation of the first key to indicate to the operator when a next key may be actuated and keyboard operating speed may thereby be increased.

Output signal $\overline{\text{ANY DATA}}$ is also coupled to control receiver mute circuit 24. Normally, $\overline{\text{ANY DATA}}$ is high to turn off transistor 52, turn on transistor 54, and A.C. couple terminal S to terminal R of network 22 through coupling capacitor 56. However, any time a tone is generated, $\overline{\text{ANY DATA}}$ goes low or false to turn off transistor 54 and leave the speaker S terminal coupled to terminal R of network 22 only through a 5K resistor 58. Resistor 58 attenuates the DTMF signals which would otherwise be uncomfortably loud for the telephone user.

A two second release output terminal ($\overline{\text{2 SEC RLS}}$) is connected to provide a signal which goes low when any key is actuated and goes high 2 seconds after a last key actuation. This signal operates internally of digital encoder 14 to indicate whether a key actuation should be interpreted as the beginning of a new number of as an additional digit of a continuing number. So long as $\overline{\text{2 SEC RLS}}$ remains low, a continuing number is presumed, but if there is a pause of more than 2 seconds between key actuations, $\overline{\text{2 SEC RLS}}$ goes high and a subsequent actuation will be treated as the beginning of a new number by digital encoder 14. During the key entry of a number, the low output of $\overline{\text{2 SEC RLS}}$ is coupled to transmitter mute circuit 26 to decouple microphone 20 terminal T from network 22 terminal R and thereby mute microphone 20 during DTMF tone generation and for 2 seconds thereafter. Acoustic noise that might otherwise interfere with decoding of the DTMF acoustic tone signals by the telephone central office are thereby shut out.

Referring now to FIG. 2, a DTMF communication system in accordance with the invention is connected as a DTMF radio transmit encoder with automatic number insertion 60. The encoder 60 includes a digital encoder 14 having the 16 data input terminals thereof connected in parallel to a read only memory (ROM) 62 having two 16-bit words of capacity and a nonencoding 16 key keyboard (not shown). By way of example, a key 64 corresponding to key number 9 is connected between a number 9 keyboard output and a common terminal. The common terminal is connected to a WAIT output of digital encoder 14 which is driven low to enable the keyboard. When output WAIT is driven low, actuation of a key such as key 64 drives a corresponding one of 16 keyboard outputs low. These outputs are connected as data inputs to digital encoder 14 and therefore an actuated keyboard output actuates a digital encoder input of digital encoder 14. A control input 1:16/2:8 is connected to +V to cause the input encoder circuitry of digital encoder 14 to treat the data input signal as a one of 16 signal. Digital encoder 14 therefore responds by generating a proper two of eight DTMF output signal that is indicative of an actuated key. The two high group and low group selected frequency sine wave signals are connected together and then coupled through a low pass filter 66 and a microphone interface circuit 68 to a radio transmitter-receiver 70.

A light emitting diode 72 incorporated in the keyboard (not shown) may be coupled through a current control resistor and an inverting buffer 74 to the WAIT input. The LED 72 will then serve as an operator interface to indicate when the encoder 60 is ready to receive an additional key actuation.

The ROM 62 may be implemented in any desired manner but may be easily implemented as a pair of diode arrays. Sixteen common cathode diodes may be coupled to an $\overline{\text{ANI 1-4}}$ output terminal to form a one word array and a second set of 16 common cathode diodes may be coupled to an $\overline{\text{ANI 5-8}}$ output terminal to form a second one word array. As indicated by way of example by diodes 76 and 78, each of the diode arrays has an anode of a diode connected to a data input line that is to be active. By selectively connecting or not connecting the diode anodes to input lines, the ROM 62 can be arranged to provide any desired arrangement of two 16 bit binary words. Digital encoder 14 separately interprets each group of four bits as a different data input during an ANI operation. The $\overline{\text{ANI 1-4}}$ and $\overline{\text{ANI 5-8}}$ outputs are also coupled through a diode AND gate 80 to a $\overline{\text{BCN CLK}}$ input which causes a next output tone signal to be generated for a next ANI character, causes the data input decoder circuits to treat the data inputs as binary coded numbers during an automatic number insertion operation, and blocks automatic resetting of ANI data input scan sequencing logic completion of an ANI operation.

The predial delay select terminals A, B, and C are connected in this example to provide a 0.1 second delay between a data input command and commencement of dual tone outputs. This provides sufficient time for the radio carrier signal to come up to full power and stabilize before modulation begins.

A 170.3 KHz crystal 38 is connected between terminals X1 and X2 to provide an internal clock operating frequency. Input terminal $20/\overline{10}$ is coupled to +V to select a 20 character per second transmission rate. Since the radio transmit encoder 60 is utilized in a radio communication system rather than a standard utility telephone system, the character transmission rate can be increased somewhat over the maximum 10 character per second rate that is acceptable by a central telephone office. The 20 per second character rate still provides a minimum 40 msec tone generation period with 10 msec between tones, but does not provide for a 40 msec decoding period following tone transmission. Input $\overline{\text{90 MS}}$ is coupled to −V to cause digital encoder 14 to limit any tone output to 90 msec regardless of how long any key may be actually actuated.

The radio transmitter-receiver 70 includes a hand held microphone 90 having a push-to-talk button 92 and may be completely conventional in nature except for the insertion of the microphone interface circuit 68 between the microphone 90 and other portions of the transmitter-receiver 70. While gates 94, 96 and 98 within microphone interface circuit 68 are shown schematically as conventional digital logic gates, it should be appreciated that these gates are intended to merely pictorially represent their intended function and that they may not operate in a manner identical to a digital logic gate. For example, gate 96 passes an audio signal from microphone 90 only when enabled by a low or false logic level on signal $\overline{\text{2 SEC RSL}}$ while OR gate 98 passes on any audio signal that might be received either from gate 96 or from low pass filter 66 at the tone output of digital encoder 14. Depending upon the exact characteristics and construction of any particular transmitter receiver 70 with microphone 90, the gtes 94, 96, and 98 as well as a buffer 100 may require signal translation between the electrical signal levels at the microphone 90 and the electrical signal levels utilized by digital encoder 14.

A radio user washing to effect a transmission over transmitter-receiver 70 initiates the transmission in a conventional manner by actuating push-to-talk button 92. Actuation of push-to-talk button 92 is communicated through OR gate 94 to activate the carrier signal of transmitter-receiver 70 in a conventional manner. However, actuation of the push-to-talk button also is communicated through buffer 100 to one input of a NAND gate 102 whose output responds by going high. The output of NAND gate 102 is coupled to an ANI START input of digital encoder 14. Activation of this input causes first a predial delay which is selected to be 0.1 second to provide the radio carrier signal time to come up to full power and stabilize and second, causes an ANI operation during which eight hexidecimal characters stored by ROM 62 in binary coded form are communicated as DTMF signals through OR gate 98 to the audio input of transmitter-receiver 70 for transmission as radio signals.

As soon as the ANI START input is active, digital encoder 14 generates a low signal at output $\overline{\text{2 SEC RLS}}$ which is coupled to enable one input to OR gate 94 to insure that the radio transmitter-receiver 70 continues to transmit the complete ANI number sequence even if push-to-talk button 92 is released in the interim. Signal $\overline{\text{2 SEC RLS}}$ is also coupled to one input of AND gate 96. This low input to AND gate 96 disables the output and prevents any audio noise that might be picked up from microphone 90 from being combined with the DTMF signals. A special latching circuit circumvents the 2 second delay on signal $\overline{\text{2 SEC RLS}}$ when signal generation is initiated by the ANI START input so that signal $\overline{\text{2 SEC RLS}}$ goes high to enable AND gate 96 and permit user audio transmission as soon as the ANI tone generation sequence is complete.

A radio communication may also be initiated by actuation of a keyboard key. For example, if key 64 is actuated, digital encoder 14 responds by generating a logic 1 WAIT signal which disables further keyboard entries, a logic 0 $\overline{\text{2 SEC RLS}}$ signal which is coupled to activate the output of NAND gate 102 to start an ANI sequence, and which causes microphone interface circuit 68 to turn on the transmitter of transmitter receiver 70 and disable audio signals from microphone 90.

After a 0.1 second predial delay, the same eight character data information stored in ROM 62 that was generated in response to actuation of push-to-talk button 92 is generated and transmitted through transmitter-receiver 70. Following generation of the last ANI tone signal, output signal WAIT goes low to enable the keyboard and turn-on LED 72 and output signal $\overline{\text{2 SEC RLS}}$ remains low. However, the enabling of the keyboard causes the key 64, which was initially actuated, and which remains actuated during the very short ANI operation, to again be detected. However, this time a latch within digital encoder 14 prevents encoder 14 from initiating a new ANI operation and the tone signals corresponding to key 64 are generated and transmitted through transmitter-receiver 70. Recognition of the key input causes output signal WAIT to go high to disable the keyboard and LED 72 until completion of the tone corresponding to the first key actuation. Upon completion of tone generation for the first key entry, signal WAIT again goes low to enable the keyboard as well as LED 72 and output signal $\overline{\text{2 SEC RLS}}$ remains low. The key entry sequence is then repeated for each key actuation. Because DTMF tone generation was initiated in this instance by a keyboard input rather than the ANI start input, output signal $\overline{\text{2 SEC RLS}}$ remains low for 2 seconds following the last key actuation. During this 2 second delay a user may actuate push-to-talk button 92 to maintain the transmitter-receiver 70 in a transmit mode and permit user audio communication at the end of the 2 seconds.

Referring now to FIG. 3, a DTMF data communication system 120 is shown as including a digital encoder 14 coupled to a data unit 122 having an operator panel 124. The data unit 122 may be a repertory dialer, a programmable data processing system, or any other data system capable of sequentially providing four bit binary coded digital data output signals which are coupled to data input pins 13–16 of digital encoder 14 and a binary coded number clock signal which is coupled to input $\overline{\text{BCN CK}}$ of digital encoder 14 to indicate that valid data exists on data input pins 13–16 and initiate a DTMF output tone sequence.

Digital encoder 14 provides as an output a 10.6 KHz clock signal which may be communicated to data unit 122 to avoid the duplication of a second clock signal generator within data unit 122. In addition, an interdigit pulse output generates a signal that goes true upon termination of a tone generation interval. This pulse may be communicated to data unit 122 as a synchronization signal. The WAIT output signal of digital encoder 14 may be optionally communicated to the data unit to provide feedback as to the proper operation of digital encoder 14 and the two second release output signal may also be optionally communicated to data unit 122. A bidirectional clear input-output of digital encoder 14 may be optionally connected to data unit 122 to permit digital encoder 14 to clear data unit 122 at power turn-on or to permit data unit 122 to clear the digital encoder 14 on communication of a signal to the clear input-output terminal. Input terminal BCN is also connected to data unit 122 and must be driven high before initiation of signal $\overline{\text{BCN CK}}$ to indicate that the digital encoder 14 is receiving a binary coded number. Input terminal BCN could optionally be connected to +V and permanently enabled thereby. Predial select input terminals A, B, and C are disconnected, causing a 0 second delay to be selected. However, if desired, these terminals can be selectively coupled to +V or −V to provide predetermined delays of 0.1 second, 0.5 second, 1.0 second, 1.5 second or infinity. Infinite delay is achieved by driving all three terminals to +V and may be utilized to temporarily disable operation of digital encoder 14, for example when the DTMF tone signals are to be communicated through a communication system that is temporarily busy. Signal input $\overline{\text{90 MS}}$ is coupled to −V to limit tone generation times to 90 msec and signal input 20/$\overline{10}$ is coupled to +V to enable a 20 tone per second signal generation rate. A 170.3 KHz crystal 38 is coupled across input terminals X1 and X2 and the high group and low group tone output terminals are connected together and through a large coupling capacitor 126 and a low pass filter 128 to a suitable tone communication system (not shown).

Though the tone communication system is not specifically shown, it may be a standard utility telephone system as shown in FIG. 1 or a radio transmitter as shown in FIG. 2. Any suitable communication system may of course be employed and the output signals $\overline{\text{ANY DATA}}$ and $\overline{\text{2 SEC RLS}}$ may be employed to provide interfacing and synchronization with the communication system.

As shown in FIG. 4, a data input and decoder portion 140 of digital encoder 14 includes a first part 142 containing circuitry that is electrically powered by the −V STANDBY power terminal of digital encoder 14 and a second part 144 that is electrically powered by the −V SWITCHED power input terminal of digital encoder 14. A dashed line 146 indicates the boundaries between the portions of the data input circuit 142 that are standby powered and the portions 144 that are powered only when the digital encoder 14 is active.

The 16 data inputs are combined into groups of four for ease of disclosure. Input terminals $\overline{1-4}$ represented by arrow 148 may selectively represent nonencoded key inputs $\overline{1-4}$, two of eight inputs $\overline{L4-L1}$, or the fifth and eighth characters of an ANI operation. Arrow 149 represents non-encoded key inputs $\overline{5-8}$, two of eight inputs $\overline{H4-H1}$, or ANI characters 3 and 7. Arrow 150 represents non-encoded key inputs $\overline{9}$, $\overline{10}$, $\overline{*}$, and $\overline{\#}$, or ANI characters 2 and 6. Similarly, arrow 151 represents non-encoded key inputs $\overline{A-D}$, ANI characters 1 and 5, and provides four binary inputs for a four bit binary digit. A bias circuit 152 connects all data inputs to +V or common through a high impedance to thereby disable any input that is not activated by actually being pulled low toward −V. An enable gate 154 further disables the inputs by coupling each input through a lower impedance switch to +V unless okay to dial signal OKTD goes true to open the switches.

The exact path which a given data input will take through the data input circuit 140 will depend upon the exact nature of the data and the selection of control inputs for digital encoder 14. For example, if data is externally generated, as by a keyboard, an input terminal $1:16/\overline{2:8}$ is coupled to −V causing $\overline{2 \text{ of } 8}$ data to be presumed and causing a signal 2 of 8 to be generated and enable a gate 156. Enabling of gate 156 permits information on input lines $\overline{1-4}$ designated by arrow 148 to be communicated in parallel to low tone gate and latch circuit 158. The enabling of gate 156 also allows data input lines $\overline{5-8}$ as indicated by arrow 149 to be communicated directly to a high tone gate and latch circuit 160. A signal $\overline{\text{TONE ON}}$ enables a clock input to latches 158 and 160 in the absence of DTMF tone generation by digital encoder 14 to permit a latch to assume any state as necessary to conform with a data input. However, upon initiation of a DTMF tone, signal $\overline{\text{TONE ON}}$ goes low to inhibit further changes in the latched signals of latches 158 and 160 to prevent changes in a commanded tone during a tone generation interval. The tone gate and latch circuits 158 and 160 each provide four outputs, one for each input. The outputs of latch 158 are tone command latched signals designated TCL1-TCL4 and exactly one must be true during a tone generation interval to command a low tone frequency. Similarly, the tone command high outputs of latch 160 are designated TCH1-TCH4 and exactly one must be high durig a tone generation interval to command a single tone frequency from a high frequency group of tones.

In the event that control input $1:16/\overline{2:8}$ is coupled to +V, signal $\overline{2 \text{ of } 8}$ is driven high to disable gte 156 and a 1 of 16 signal goes low to enable a gate 162. Gate 162 couples all 16 data input lines to a 16:2/8 encoder matrix 164 which provides a conversion from a 1 of 16 data format to a 2 of 8 data format which is output on two sets of four conductors 164, 165. A gate 166 is enabled by the complement of signal $\overline{2 \text{ of } 8}$ and thereby couples the signals on conductos 164 to high tone gate and latch circuit 160 and the signals on conductors 165 to low tone gate and latch circuit 158. The latches 158 and 160 are thus able to output low group and high group tone commands respectively regardless of whether the original input data is in a 1 of 16 or a 2 of 8 format.

Under most operating conditions, a 16:4 multiplexer receives a $\overline{\text{SCAN 1}}$ active low signal which causes it to couple input data group 151 to a 4:16 decoder matrix 172. Decoder matrix 172 receives a four bit binary input on a group of four conductors as selected by the four scan signals and outputs a decoded 1 of 16 signal on 16 separate data lines in response thereto. These 16 data lines correspond to the 16 data input lines and are coupled through a gate 174 to the 16 data lines from gate 162 which form the 16 inputs to encoder matrix 164. Encoder matrix 164 thus may receive a 1 of 16 input from gate 162, a 1 of 16 input from gate 174, or no input at all. In the event that binary data is being input to digital encoder 14 on the 4 $\overline{\text{BCN}}$ data inputs represented by arrow 151, input control signal BCN select must be coupled to +V to cause a signal $\overline{\text{BIN}}$ to be driven low to enable gate 174 and enable the 1 of 16 decoded signal representing the binary coded number on input lines 151 to be coupled to encoder matrix 164. Signal 2 of 8 is the complement of signal $\overline{2 \text{ of } 8}$ and is therefore at logic 0 to enable the 2 of 8 encoded output of encoder matrix 164 to be coupled to the tone gate and latch circuits 150, 160 in a manner identical to the 1 of 16 inputs of the previous example.

During an automatic number insertion (ANI) operation signal $\overline{\text{BIN}}$ is driven low to enable gate 174 and signal 2 of 8 is driven low to enable gate 166. The data input circuit functions as a binary number input circuit as described in the immediately above example except that the SCAN 1-SCAN 4 inputs to multiplexer 170 are sequentially actuated to input a first word from ROM 62 providing input words 1-4 on conductor groups 151-148 respectively and are sequentially actuated a second time to input a second word from a second portion of ROM 62 having characters 5-8 on input conductor groups 151-148 respectively.

A 16 input NAND gate 180 has each input coupled to a different 1 of 16 input conductors from gate 154 and therefore generates an output signal KEY DOWN any time any data input is presented to digital encoder 14 while enable gate 154 is enabled by okay to dial signal OKTD.

Similarly, a 4 input NAND gate 182 has each of its four NAND gate 184 has each of its four inputs connected to a different conductor of group 149. The outputs of gates 182 and 184 are connected to different inputs of a 2 input NAND gate 186 whose output is in turn coupled as 1 input of a NAND gate 188. The second input of NAND gate 188 is connected to signal 2 of 8 and its output is connected to 1 of 3 inputs to a wrong number of keys detect NAND gate 190. NAND gates 182, 184, 186 and 188 operate to require that at least one low group data input 148 be active and that at least one high group data input 149 be active. In the event that some other type of input is being processed, signal 2 of 8 is low causing the output of NAND gate 188 to go high and have no effect on gate 190. However, if signal 2 of 8 enables NAND gate 188, its output will go active low to indicate an error signal unless the output of NAND gate 186 is low. However, the output of gate 186 will be low only if NAND gate 182 detects at least one signal actuation on conductor group 148 and NAND gate 184 detects at least one signal actuation on conductor group 149. A first greater than 1 of 4 error detector circuit 192 responds to the four data inputs to high tone gate and latch circuit 160 to generate an active low output signal to NAND gate 190 in the event that a signal appears on two or more of the four input lines to latch 160. Similarly, a greater than 1 of 4 detector circuit 194 responds to the four data inputs to low tone gate and latch circuit 158 to generate an active low signal that is coupled to NAND gate 190 in the event that two or more signals are active among the four inputs to low tone gate and latch circuit 158. The output of NAND gate 190 thus goes high to indicate a wrong number of keys error signal WNOK in the event that at least one high group data input signal and at least one low group data input signal is not generated during a 2 of 8 data input mode or in the event that more than 1 of 4 data input signals are active at the input to low tone latch 158 or in the event that more than 1 of 4 data input signals are active at any time at the input to high tone gate and latch circuit 160.

Referring now to FIG. 5, a power control circuit 200 includes a power up latch circuit 202 and a power off enable latch circuit 204, a NAND gate 206, a NOR gate 208, and a P MOS FET 210. The entire power control circuit 200 is coupled to the −V standby power input terminal and thus remains under power during standby conditions. There are only two ways in which the digital encoder circuit 14 can be transformed from a standby mode of operation to an active mode of operation. One is the actuation of a data input which generates a key down signal that is coupled as one input to NOR gate 208 and the other is the generation of an ANI start input command signal that is coupled as a second input to NOR gate 208. Either of these start signals will cause the output of NOR gate 208 to go low and thereby set latch 202 and reset power off enable latch 204. The setting of power up latch 202 causes it to generate a power up signal which is inter alia inverted and coupled to drive a $\overline{\text{POWER UP}}$ output terminal that may be utilized to control the switching of power to the power input terminal −VSW of digital encoder 14 as discussed in conjunction with FIG. 1 to provide power to the non-standby or switched portion of digital encoder 14.

Signal $\overline{\text{SET POWER FF}}$ from NOR gate 208 is also coupled as one input to NAND gate 206. Other inputs of NAND gate 206 are coupled to the Q output of power off enable latch 204 and signal $\overline{\text{ACTIVE}}$. Signal $\overline{\text{ACTIVE}}$ is the complement of the output terminal signal $\overline{\text{2 SEC RLS}}$ of digital encoder 14. Signal $\overline{\text{ACTIVE}}$ goes low upon detection of an ANI START signal or a KEY DOWN signal and remains low until termination of a last DTMF data tone for an ANI start and for 2 seconds after a last DTMF data tone for a key down start. Thus, the resetting of power up latch 202 is enabled only after termination of a last tone signal as indicated by signal $\overline{\text{ACTIVE}}$, only when no start inputs are active as indicated by signal $\overline{\text{SET POWER FF}}$, and only when signal POE from power on enable latch 204 is high. Latch 204 is reset by signal $\overline{\text{SET POWER FF}}$ and disables the turning off of switched power during key bounce and predial time delays. However, as soon as digital encoder 14 begins generating a DTMF tone output signal, signal $\overline{\text{TONE ON}}$ goes low to close transistor switch 210 and couple the $\overline{\text{SET}}$ input of latch 104 to −V and thereby cause latch 204 to set. This setting of latch 204 enables power up latch 204 to be reset upon termination of the tone signal when other reset conditions are met.

As snown in FIG. 6, the power-on clear circuit 220 includes a power-on clear detector 222 and an inverter gate 224. The power-on clear circuit 222 is coupled to respond to the application of power to power input terminal −VSW and generate a logic 0 output signal $\overline{\text{P.O CLR}}$ in the form of a pulse which is coupled through inverter gate 224 to provide an internal clear signal to digital encoder 14 and to provide a clear output signal to input-output terminal CLEAR of digital encoder 14. The internal clear signal may thus be generated either by the power-on clear circuit or by an input command through input-output terminal CLEAR.

Figure 7:
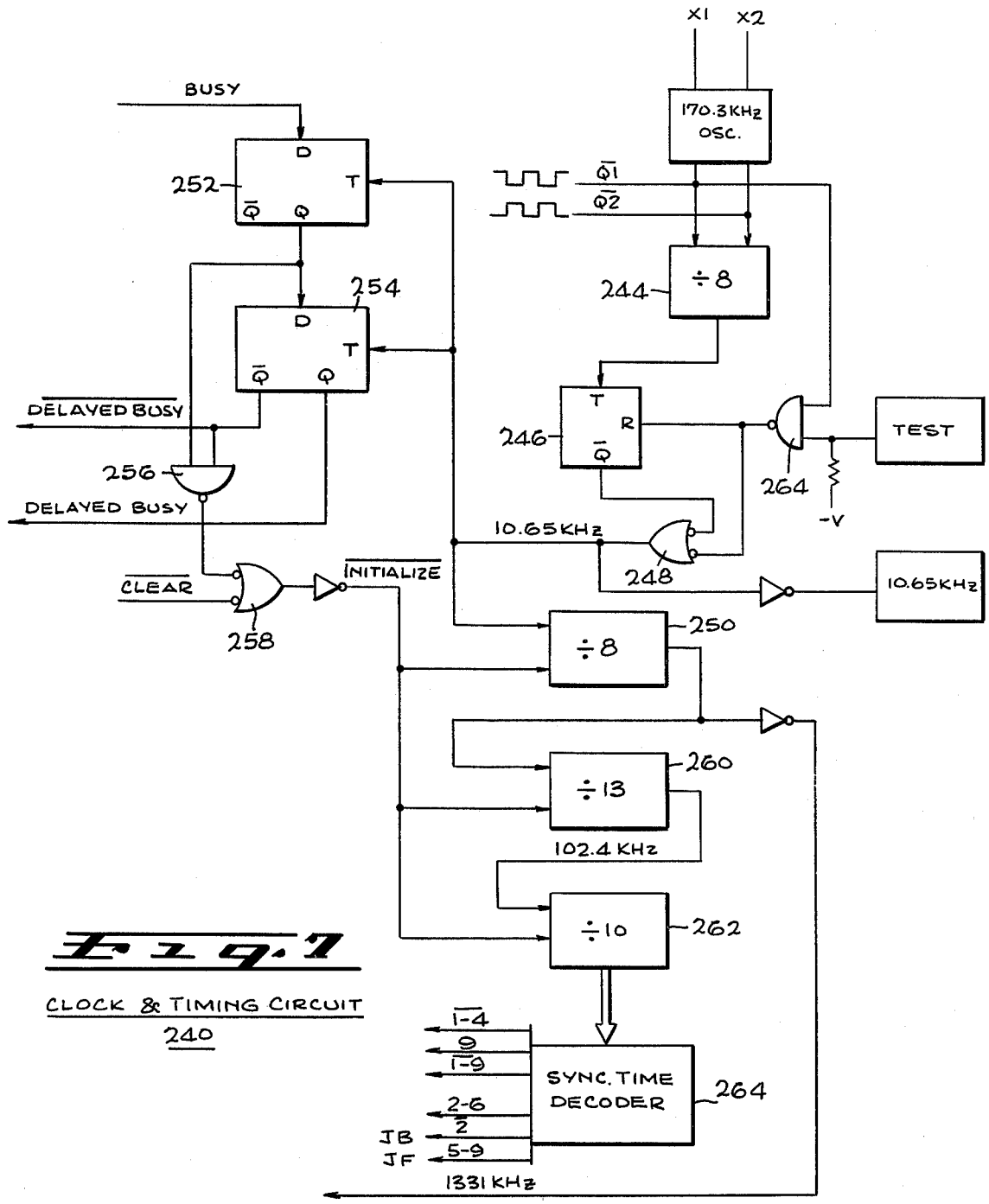
FIG. 7 is a schematic and block diagram representation of a clock and timing circuit for a digital encoder used in the system shown in FIGS. 1-3.

As shown in FIG. 7, a clock and timing circuit 240 includes a 170.3 KHz crystal oscillator 242 providing complementary clock signal output signals $\overline{01}$ and $\overline{02}$ at a frequency of 170.3 KHz. These signals are coupled to a divide by 8 counter 244 whose input is coupled to a toggling flip-flop 246 which provides a 10.65 KHz clock signal through a NAND gate 248. This signal is coupled through an inverter to an output terminal designated 10.65 $\overline{\text{KHz}}$ for use by external circuitry, to a divide by 8 counter 250 and to the clock or trigger inputs of a pair of D-type input flip-flops 252, 254.

The D input to flip-flop 252 is connected to a signal BUSY which goes true upon detection of a data input command and goes false upon termination of a DTMF tone generated in response to the command. The Q output of flip-flop 252 is coupled to the D input of flip-flop 254 whose Q output in turn generates a signal designated DELAYED BUSY. Signal DELAYED BUSY emulates signal busy but with a time delay of 0.1–0.2 msec. A NAND gate 256 has its two inputs connected to the $\overline{\text{Q}}$ output of flip-flop 252 and the Q output of flip-flop 256 to generate an INITIALIZE command during the 0.1 msec interval between the setting of flip-flop 252 and the setting of flip-flop 254 following the leading edge of a BUSY signal. A NAND gate 258 has one input connected to the output of gate 256 and a second input connected to a signal $\overline{\text{CLEAR}}$. Any time the output of NAND gate 256 goes active low or signal $\overline{\text{CLEAR}}$ goes active low, NAND gate 258 generates an INITIALIZE signal which is coupled to reset counter 250, a divide by 13 counter 260, and a divide by 10 counter 262.

A special test circuit is implemented by connecting a NAND gate 264 to a test terminal input and also to clock signal $\overline{01}$. The output of NAND gate 264 is conneceted as a reset input to flip-flop 246 and also to NAND gate 248. In th event that logic 1 is applied to the test input terminal, flip-flop 246 is repeatedly reset and the 170.3 KHz signal $\overline{01}$ is coupled through NAND gate 248 instead of the usual 10.65 KHz signal. Use of this high frequency test signal helps reduce chip production costs by enabling testing at a rate 16 times faster than would otherwise be possible.

Divide by 8 counter 250 generates an output clock signal at a frequency of 1331 Hz which is coupled through divide by 13 counter 260 to a 10 state divide by 10 counter 262. Counter 262 provides 10 successive 10 msec intervals designated 0–9 which are detected by sync time decoder 264 to provide sync time output signals which are utilized for controlling and sequencing digital encoder 14. A signal $\overline{\text{1-4}}$ is active low during sync times 1–4 and high during the remaining sync times 5–0. Similarly, a signal 9 is active during sync time 9 and low otherwise. Signal $\overline{\text{1-9}}$ is low during sync times 1–9 and high during time 0. In similar manner, sync time decoder 264 generates output signals to indicate sync times 2–6, $\overline{2}$ and 5–9.

Figure 8:
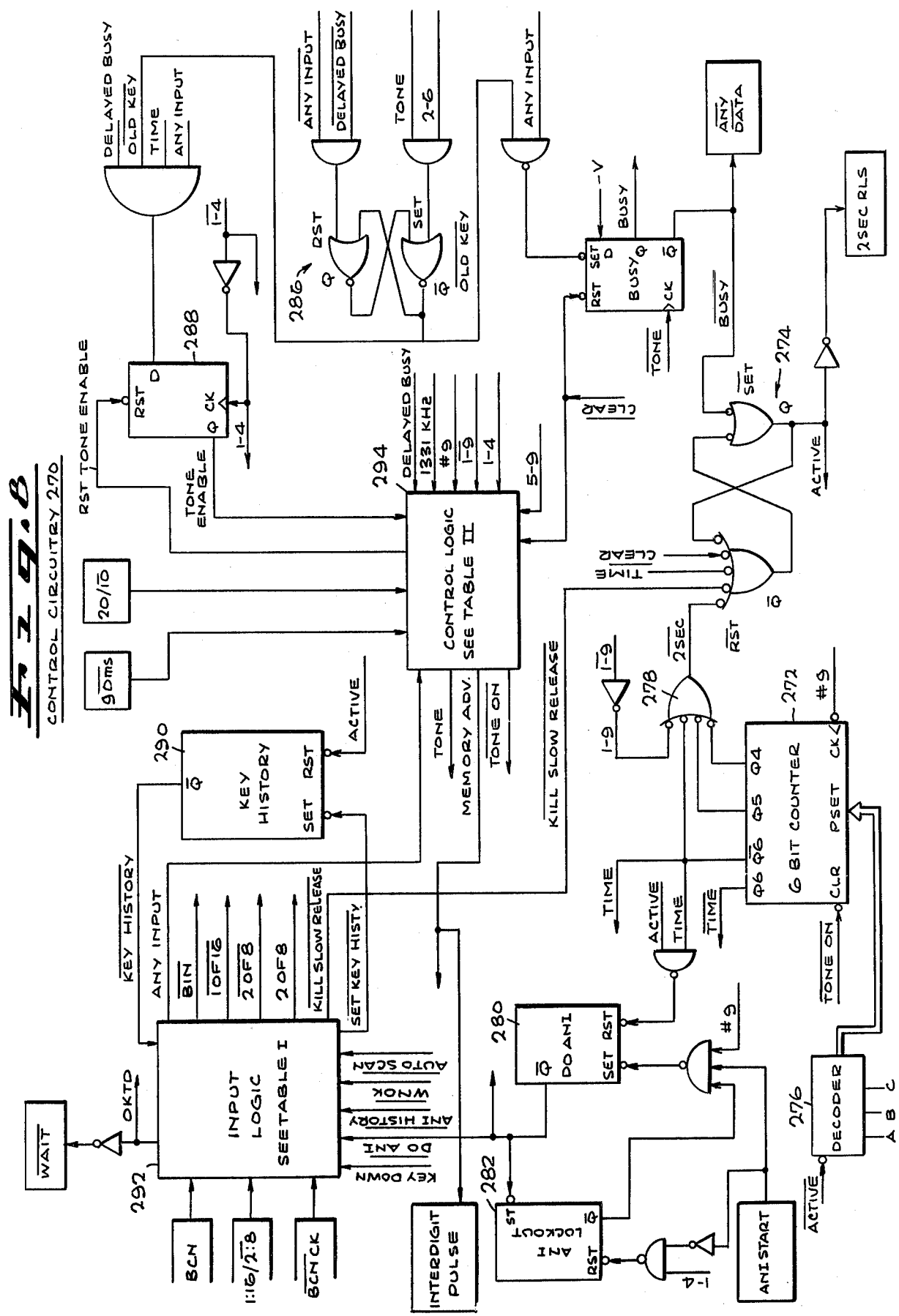
FIG. 8 is a schematic and block diagram representation of control circuitry for a digital encoder used in the systems shown in FIGS. 1-3.

Referring now to FIG. 8, control circuitry 270 shown therein sequences keyboard data entry operations. A 6 bit counter 272 provides a selectable pre-dial delay and provides a 2 second timing interval after the termination of each tone to control the resetting of an active latch 274 which generates an internal active signal whose complement is the $\overline{\text{2 SEC RLS}}$ signal. A decoder 276 has timing control inputs A, B and C as well as a preset enable input $\overline{\text{ACTIVE}}$ and is coupled to preset 6 bit counter 272 to a state determined by inputs A, B, C when the ACTIVE signal is at logic 1. A signal $\overline{\text{TONE ON}}$ is coupled to a clear input of counter 272 to maintain the counter 272 in an all 0 or clear condition whenever DTMF tones are being generated. A signal TIME is taken from the $\overline{\text{Q6}}$ output of counter 272 and a NAND gate 278 has four inputs coupled to $\overline{\text{Q6}}$, Q5, Q4 and sync time signal 1-9. The output of NAND gate 278 thus goes high during sync times 1-9 when counter 272 reaches a count of decimal 20. The clock input to counter 272 is coupled to the sync time #9 signal which has a 0.1 second period. Thus, counter 276 counts from 0 to 20 to activate NAND gate 278 in approximately 2 seconds. Decoder 276 is coupled to preset counter 272 with a 2's complement binary negative number in accordance with a selection of inputs A, B and C. Although the encoder may in general be constructed to provide any desired combinations of preset count, in the present example decoder 278 causes counter 272 to be preset to count 0 if inputs A, B and C are at logic 0 respectively. If the inputs are 110, the count is $-1$; if the inputs are 100, the count is $-5$; if the inputs are 010, the count is $-10$; and if the inputs are 001, the count is $-15$. If the inputs A, B and C are all coupled to $+V$, decoder 276 is coupled to constrain bit 6 to be preset to logic 1 and held in this preset state irrespective of signal ACTIVE. The predial delay may thus become infinite so long as A, B and C are all selected and this feature may be used for encoder selection, for example when several encoders are included in a given system and less than all of the encoders may be selected at any one time.

A DO ANI latch 280 and an ANI lock-out latch 282 operate to provide a single pulse $\overline{\text{DO ANI}}$ in response to an ANI START input, regardless of how long the ANI start input is maintained. In the absence of a lock-out, DO ANI latch 280 is set by the coincidence of an ANI START input signal and a sync time #9 signal. The setting of latch DO ANI 280 simultaneously sets ANI lock-out latch 282 to prevent any further setting of DO ANI latch 280 until after lock-out latch 282 receives a reset signal in response to the coincidence of a logic 0 ANI START input and sync time 1-4. Once set, DO ANI latch 280 remains set until signal TIME goes high to indicate the end of a predial delay in coincidence with signal ACTIVE. At the end of the predial delay, DO ANI latch 280 is therefore reset and remains reset until the ANI START input is first released and then reactivated.

Active latch 274 has a $\overline{\text{set input}}$ coupled to set the latch in response to signal $\overline{\text{BUSY}}$ going low. Active latch 274 is also coupled to be reset by a low condition many of the signals $\overline{\text{CLEAR}}$, TIME, $\overline{\text{KILL SLOW RELEASE}}$, or $\overline{\text{2 SEC}}$ generated by the output of NAND gate 278. Signal Active is generated at the Q output of latch 274 which in general becomes set upon the receipt of input data by encoder 14 and remains set until 2 seconds after determination of a last tone signal.

A BUSY flip-flop 284 has a set input responsive to the coincidence of signal ANY INPUT and a signal $\overline{\text{OLD KEY}}$, which indicates that the input signal is a new signal that has not already been processed by a digital encoder 14. BUSY flip-flop 284 is coupled to be reset by signal CLEAR and is also coupled to be set to state 0 when clocked by signal $\overline{\text{TONE}}$. In general, flip-flop 284 becomes set upon receipt of a new data input signal and is reset upon termination of the DTMF tones corresponding to the data input signal.

An OLD KEY latch 286 is coupled to be set during sync times 2-6 in synchronization with signal TONE which commands the generation of DTMF tones. Latch 286 remains set to inhibit the setting of BUSY flip-flop 284 until OLD KEY latch 286 is reset by the coincidence of signal $\overline{\text{ANY INPUT}}$ and $\overline{\text{DELAYED BUSY}}$. The coincidence of these two signals indicates that a first key actuation or other data input has terminated and that any following actuation or data input therefore represents a new data input command that has been initiated subsequent to the DTMF tones for a preceding data input command. A tone enable latch 288 is clocked by sync time signal 1-4 and is coupled to be set only upon the coincidence of signals DELAYED BUSY, $\overline{\text{OLD KEY}}$, TIME and ANY INPUT. Since sync time counter 262 is reset upon detection of entered data, a 10 msec debounce time lapses during sync time 0 before tone enable flip-flop 288 can be clocked to enable the generation of DTMF tones. A signal TONE ENABLE is generated at the Q output of flip-flop 288 only when signal TIME indicates that a predial delay has expired, signal ANY INPUT indicates that a data input remains active, signal $\overline{\text{OLD KEY}}$ indicates that new data is being input, and signal DELAYED BUSY indicates that there has been time for clock and timing circuit 250 to be reset by the initialized signal.

A key history flip-flop 290 retains information on whether or not a digital encoder operation has been initiated by a keyboard entry or by some other means such as an ANI START command or a binary number clock signal $\overline{\text{BCN CK}}$. Input logic 292 provides a signal SET KEY HISTORY which sets key history flip-flop 290 when the KEY DOWN signal, which indicates actuation of one of the data input terminals, appears in coincidence with the absence of an ANI history signal and the absence of an auto scan signal ACTIVE two seconds after the generation of a last set of DTMF tone signals.

Input logic 292 contains sequential logic to generate the output signals as defined by the logic equations in Table I. Because the logic function outputs of input logic 292 are defined by Table I and similarly the logic outputs of control logic 294 are defined by Table II, the schematic logic diagrams have not been included in the drawings. However, it will be appreciated by a person of ordinary skill in the art that the logic equations of Tables I and II completely define the logic functions and that the input logic 292 and control logic 294 can be implemented from the logic equations provided in Tables I and II.

TABLE I

ANY INPUT = BCN CK · (AUTO SCAN + BCN) +

DO ANI + AUTO SCAN · $\overline{\text{BCN}}$ · KEY

DOWN · $\overline{\text{WNOK}}$

BIN = AUTO SCAN + BCN

TABLE I-continued $\overline{1 \text{ of } 16} = \overline{1:16}/\overline{2:8} \cdot \overline{\text{BIN}}$ $2 \text{ of } 8 = \overline{\text{BIN}} \cdot \overline{1:16/\overline{2:8}}$ $\overline{2 \text{ of } 8} = \overline{\text{BIN}} + \overline{1:16/\overline{2:8}}$ $\overline{\text{KILL SLOW RELEASE}} + $ $\overline{\text{ANI HISTORY} \cdot \overline{\text{KEY HISTORY}} \cdot 1\text{-}4}$ $\overline{\text{SET KEY HISTORY}} +$ $\overline{\text{KEY DOWN} \cdot \overline{\text{ANI HISTORY}} \cdot \overline{\text{AUTO SCAN}}}$ $\text{OKTD} = \overline{\text{BIN}} \cdot (\overline{\text{ACTIVE}} + \overline{\text{TIME}}) + \overline{\text{POWER UP}}$

TABLE II $\text{TONE} = 1\text{-}9 \cdot \text{TONE ENABLE} \cdot (1\text{-}4 + \text{ANY INPUT}) +$ $\text{TONE} \cdot \overline{90 \text{ MS}} \cdot \text{ANY INPUT}$ $\overline{\text{RST TONE ENABLE}} = 20/\overline{10} \cdot 1331 \text{ Hz} \cdot \overline{\text{DELAYED BUSY}}$ $\text{MEMORY ADV} = \text{TONE ENABLE} \cdot (\#9 +$ $\overline{1331 \text{ Hz}} \cdot 5\text{-}9 \cdot 20/\overline{10})$ $\overline{\text{TONE ON}} = \overline{\text{CLEAR}} \cdot \text{TONE}$ Referring now to the logic signals defined by Table I, signal ANY INPUT commands the generation of DTMF tones with each occurrence of this signal commanding the generation of one pair of DTMF tones. Signal any input is actuated for each key stroke data entry, for each binary coded number data entry, and for each digit during an automatic number insertion (ANI) operation. The first term of ANY INPUT commands tone generation for a binary number input at the coincidence of input signal BCN and input signal BCN CK and during an ongoing ANI operation by the coincidence of signal AUTO SCAN which indicates that an ANI operation is in progress and signal BCN CK which is generated by connecting input $\overline{\text{BCN CK}}$ to the interdigit pulse output to obtain a clock signal for each digit. The second term, DO ANI, is a short pulse signal generated at the beginning of an ANI sequence and serves to initiate the ANI sequence. Thereafter, the first term of the logic equation controls the actuation of any data of signal ANY INPUT for subsequent digits of the ANI operation. The third term of any signal ANY INPUT actuates the signal in response to the entry of information through the 16 data inputs. Signal KEY DOWN goes active any time at least one of the data inputs is active and generates an ANY INPUT in coincidence with signal $\overline{\text{AUTO SCAN}}$ which indicates that an ANI operation is not in progress, signal $\overline{\text{BCN}}$ which indicates that digital encoder 14 has not been selected for binary coded numbers, and signal $\overline{\text{WNOK}}$ which indicates that a wrong number of key data inputs has not been activated.

This latter term enables the digital encoder 14 to provide an N key rollover capability. Since the concurrence of two keys will generate signal WNOK and disable signal ANY INPUT, digital encoder 14 will treat this concurrence as an absence of any input and when the first key is deactuated during a rollover, the subsequent signals resulting from a single key actuation will drive signal ANY INPUT to logic 1 and digital encoder 14 will then accept the remaining single actuation as a new input. Signal $\overline{\text{KILL SLOW RELEASE}}$ indicates the initiation of an operation of digital encoder 14 by an ANI START input when there has been an ANI operation as indicated by signal ANI HISTORY and when there has been no key entry as indicated by signal $\overline{\text{KEY HISTORY}}$ and resets active latch 274 without waiting for a 2 second delay following the last tone signal. Thus, an operation of digital encoder 14 initiated by the ANI START input signal causes signal ACTIVE and output signal $\overline{\text{2 SEC RLS}}$ to terminate without a 2 second delay that normally occurs when an operation is initiated by any other data input.

Signal $\overline{\text{SET KEY HISTORY}}$ is connected to set the key history flip-flop 290 when there has been a key actuation as indicated by signal KEY DOWN without the simultaneous occurrence of an ANI HISTORY signal or an AUTO SCAN signal. The okay to dial signal, OKTD, is generated to provide the $\overline{\text{WAIT}}$ output as a complement thereof and to control the enable gate 154 as shown in FIG. 4. Enable gate 154 connects each data input conductor to +V through a current source. If each data conductor terminal of a data source such as a special keyboard has sufficient current capacity to exceed the current supplied to each conductor by bias to +V circuit 152 but not sufficient current capacity to exceed the sum of the currents provided by bias to +V circuit 152 and enable gate 154, then that data input device will be enabled when signal OKTD turns off the current sources of enable gate 154 but disabled when signal OKTD goes to logic 0 to turn on the current sources of enable gate 154. Most data input sources have a current capacity on each data conductor which exceeds the sum of the currents provided by bias to +V circuit 152 and enable gate 154 and are therefore not affected by the state of signal OKTD. As indicated by the logic equation, signal OKTD enables a special keyboard during a standby mode when signal $\overline{\text{POWER UP}}$ is at logic 1 or when the entry of a binary coded number has not been enabled and either the predial delay time has expired or the signal $\overline{\text{ACTIVE}}$ is high.

Referring now to the logic equations of Table II, signal TONE commands the generation of a pair of DTMF audio frequency output signals. When a data input causes signal ANY INPUT to go true and the predial delay has expired, the tone enable flip-flop 288 is set to generate signal TONE ENABLE and permit the tone command to be generated during sync times 1-9. The portion of the first term within the parenthesis includes signal 1-4 which insures that once a tone is initiated it has a duration of at least Four 10 msec sync time intervals. However, so long as a key remains actuated beyond the 40 msec, the signal ANY INPUT will cause the tone signal to remain active until the end of sync time 9. After sync time 9, the second term of the TONE logic function will cause the continuation of tone generation, but only if the input $\overline{90 \text{ MS}}$ is at logic 1. If input signal $\overline{90 \text{ MS}}$ is at logic 1, a tone will continue until the signal ANY INPUT is terminated by a key release or by generation of wrong number of keys signal WNOK.

A signal $\overline{\text{RST TONE ENABLE}}$ is connected to reset the tone enable flip-flop 288 when input $20/\overline{10}$ is coupled to +V to select a data rate of 20 per second and tone generation is terminated for a short period of time to cause signal $\overline{\text{DELAYED BUSY}}$ to go true and there is an occurrence of the 1331 Hz clock signal. The signal MEMORY ADV serves as a clock signal for each digit of an ANI operation and is also provided as INTER-DIGIT PULSE output signal to provide synchronization for the entry of binary coded numbers of other data by a data entry unit. If a standard telephone data transmission rate of 10 characters per second has been selected, signal MEMORY ADVANCE provides a 10 msec clock signal during sync time #9 when the tone enable flip-flop 288 is set. On the other hand, if a rate of 20 characters per second has been selected, sync time signal 5-9 causes a memory advance pulse to be generated after a 10 msec debounce interval followed by a 40 msec DTMF tone generation interval. While the signal MEMORY ADV appears to last during sync times 5-9, in actuality, the initiation of the signal will cause a new character to be immediately encoded with the sync time counter being reset. The actual transmission rate is thus very close to 20 characters per second.

Figure 9:
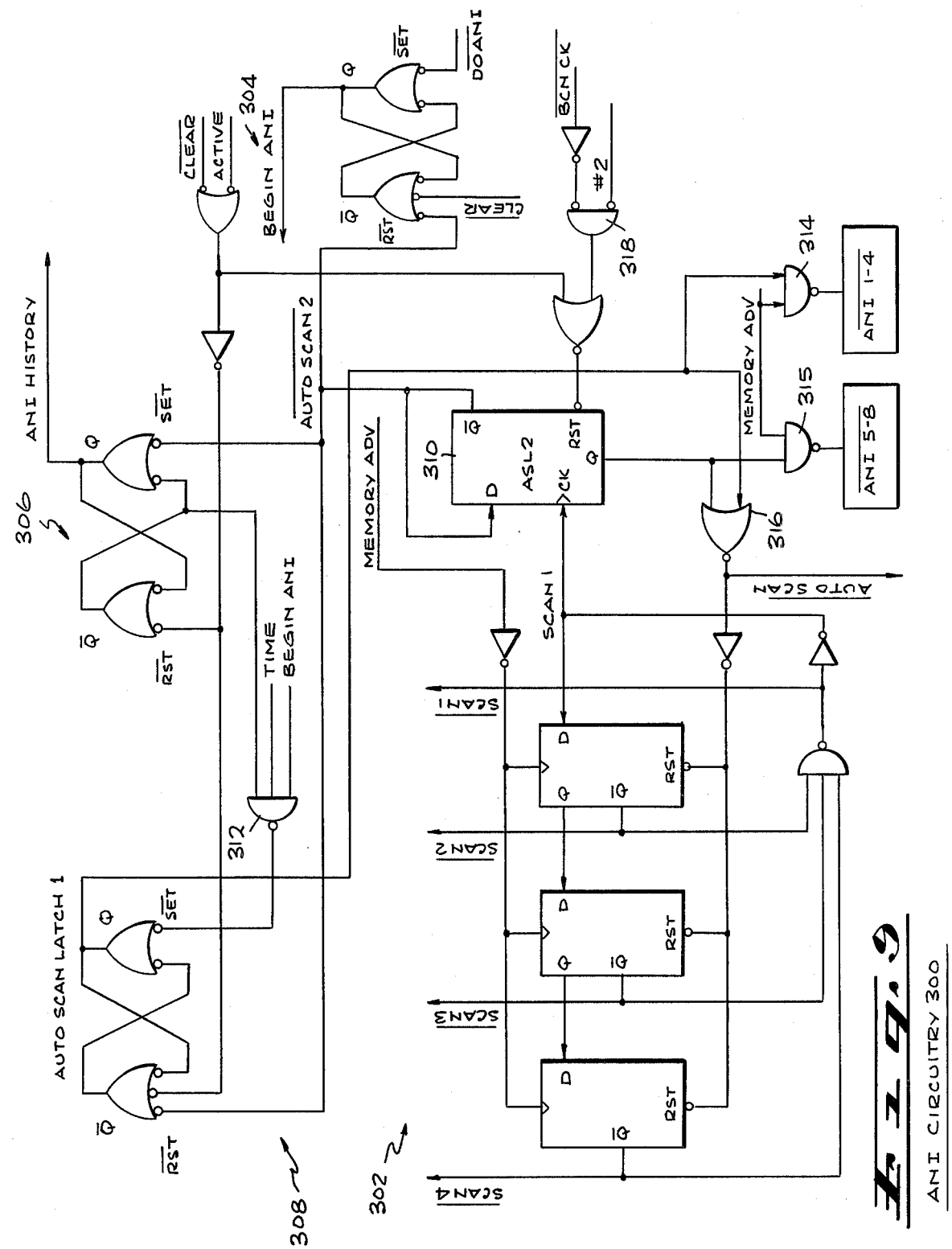
FIG. 9 is a schematic and block diagram representation of ANI circuitry used in a digital encoder for the communication systems shown in FIGS. 1-3.

Referring now to FIG. 9, ANI circuitry 300 for automatically inserting a 4 or 8 digit number into a transmission sequence includes a 4 state sequencing circuit 302, a begin ANI latch 304, an ANI history latch 306, an auto scan latch 1 308, an auto scan latch 2 310, and assorted logic gates. Signal $\overline{\text{DO ANI}}$ from ANI flip-flop 280 shown in FIG. 8 sets the begin ANI latch 304 at the beginning of an ANI operation. In the absence of the setting of ANI history flip-flop 306 to indicate a prior ANI operation, signal begin ANI in concurrence with the generation of signal TIME following a selected predial delay enables a NAND gate 312 whose output sets the auto scan latch 1 308. Latch 308 generates an auto SCAN LATCH 1 signal which disables the resetting of the flip-flops of four state sequencing circuit 302 so that upon the occurrence of the termination of the MEMORY ADV signal, the flip-flops are clocked and the active state of sequencing circuit 302 changes from SCAN 1 to SCAN 2. Subsequent terminations of the MEMORY ADV signal cause the state to advance sequentially through SCAN 3 and SCAN 4 back to SCAN 1. As the sequencing circuit 302 advances to SCAN 1, a SCAN 1 signal is generated which clocks auto scan latch 2 310 causing it to become set and generate a $\overline{\text{Q}}$ output which resets auto scan latch 1 308, sets ANI history latch 306 and resets to begin ANI latch 304. Auto scan latch 2 310 is connected in a toggling configuration such that as the four state sequencing circuit 302 sequences through the four states for ANI characters 5-8 and returns to scan state scan 1, auto scan latch 2 310 is toggled back to a reset state. While in a set state, the Q output of auto scan latch 2 310 disables the resetting of sequencing circuit 302. Once auto scan latch 2 310 is reset, the reset inputs to sequencing circuit 302 are again active to maintain it in a scan 1 state notwithstanding other occurrences of signal MEMORY ADV. An ANI operation is thus terminated after two cycles of 4 characters or scans each.

During the first cycle, the Q output of auto scan latch 1 308 enables a NAND gate 314 whose output generates the output signal $\overline{\text{ANI 1-4}}$, and permits the memory advance pulses to be passed through NAND gate 314. Similarly, during the second cycle the Q output of auto scan latch 2 310 enables a NAND gate 315 whose output generates the output signal $\overline{\text{ANI 5-8}}$. Thus, if output $\overline{\text{ANI 1-4}}$ is coupled to input $\overline{\text{BCN}}$ as shown in FIG. 2, the MEMORY ADV pulses are fed back as binary coded number clock signals and cause the activation of signal ANY INPUT. Since a NOR gate 316 generates an output signal $\overline{\text{AUTO SCAN}}$ during both of the ANI cycle times. In the event that output signal $\overline{\text{ANI 5-8}}$ is not coupled to $\overline{\text{BCN CK}}$, shortly after cycle 2 begins, a NOR gate 318 will be fully enabled by sync time signal #2 causing the auto scan latch 2 310 to be reset. A cycle 2 ANI operation will thus be terminated before it fully gets started.

Figure 10:
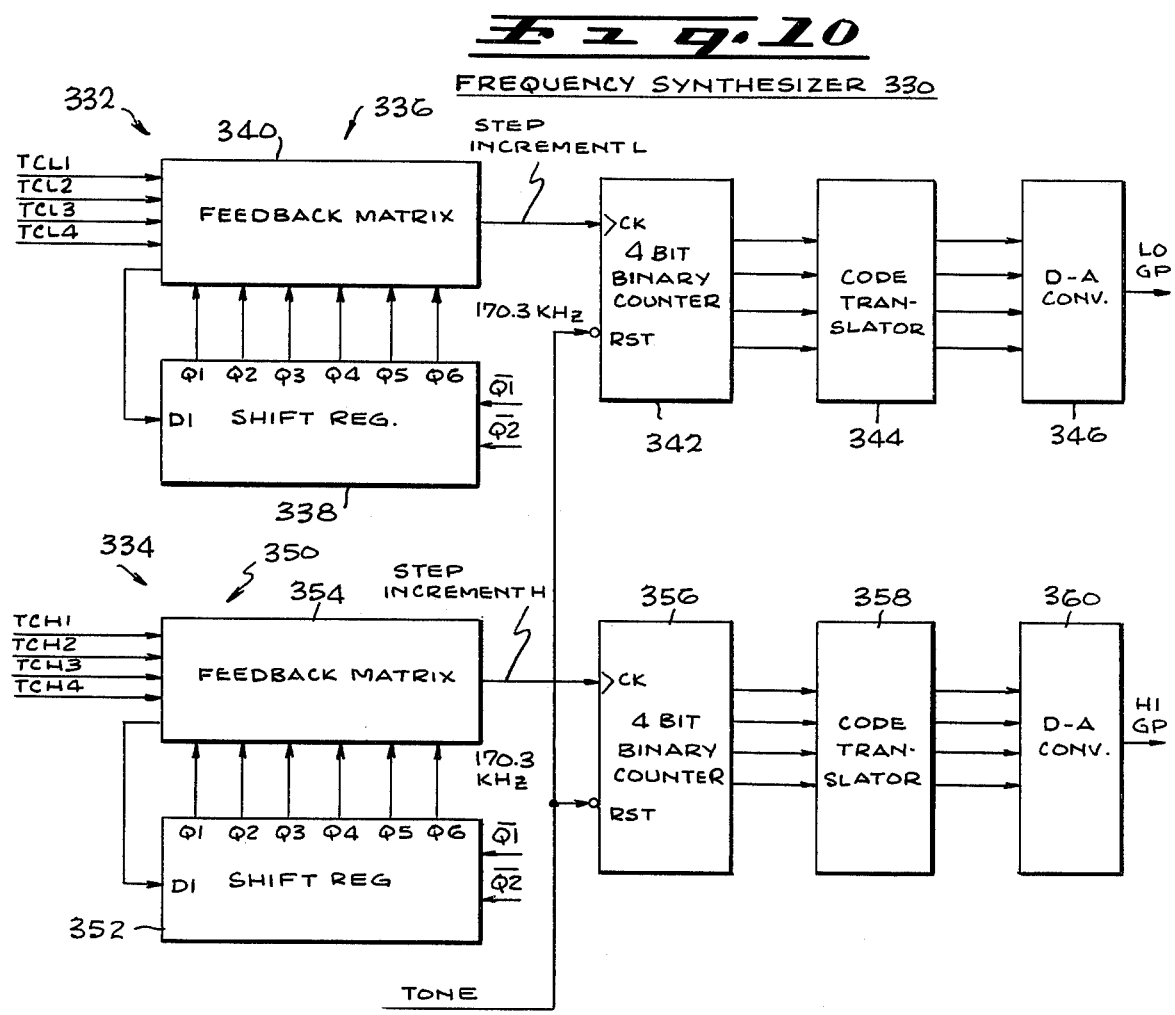
FIG. 10 is a block diagram representation of a frequency synthesizer used in a digital encoder for the communication systems shown in FIGS. 1-3.

Referring now to FIG. 10, a frequency synthesizer 330 within digital encoder 14 includes a low frequency tone generator circuit 332 and a high frequency tone generator circuit 334. The low frequency tone generator circuit 332 includes a programmable counter 336 which is implemented in this example as a 6 bit shift register 338 and a feedback matrix 340 which controls the least significant bit or D1 input to shift register 338 to cause it to repeatedly sequence through a selected number of steps or counts as determined by low tone frequency select signals TCL1-TCL4 from latch 158 in FIG. 4. It should be appreciated, however, that while the programmable counter 336 has been implemented in a manner that is particularly advantageous for fabrication as a P MOS integrated circuit, in general programmable counter 336 may be any recycling counter having a selectable number of different sequential count states.

A 4 bit binary counter 342 has a clock input coupled to receive a signal STEP INCREMENT L from feedback matrix 340. Binary counter 342 divides each sine wave period into 16 discrete steps or intervals and is clocked by signal STEP INCREMENT L at a rate of approximately 16 times the desired DTMF tone frequency to cause counter 342 to sequence through one count cycle for each sine wave output cycle. Counter 342 has a complementing reset input connected to signal TONE and therefore is free to count repetitions of clock signal STEP INCREMENT L in the presence of a TONE signal but is constrained to a reset condition in the absence of a TONE signal. A code translator 344 receives the 4 bit binary output from binary counter 342 and in response thereto generates a digital binary code output signal that is indicative of a desired sine wave magnitude for each of the 16 portions of a sine wave period defined by binary counter 342. A digital-to-analog converter 346 receives the 4 bit binary sine wave magnitude signal from code translator 344 and converts this signal to an analog signal LO GP having an analog magnitude proportional to a binary count defined by the output of code translator 344. Signal LO GP becomes the low tone group frequency DTMF output signal for digital encoder 14.

Except that different frequencies are involved, the high frequency tone generator circuit 334 is generally similar to low frequency tone generator circuit 332. High frequency tone generator circuit includes a programmable counter 350 including a 6 bit shift register 352 and a feedback matrix 354 responsive to the six outputs of shift register 352 and the high frequency group tone command signals TCH1-TCH4 from latch 160 as shown in FIG. 4.

Feedback matrix 354 provides a STEP INCREMENT H signal at a frequency approximately 16 times a desired high tone group DTMF output frequency which increments a 4 bit binary counter 356. Counter 356 is reset in the absence of signal TONE and is permitted to count only in the presence of signal TONE. The 4 binary outputs of counter 356 are coupled as inputs to a code translator 358 which is identical to code translator 344. Code translator 358 has 4 binary outputs which are coupled as inputs to a digital-to-analog converter 360 that may be identical to A–D converter 346. Digital-to-analog convertr 360 provides an output signal HI GP that is the high group DTMF tone frequency output for digital encoder 14.

Frequency synthesizer 330 divides each output sine wave period into a plurality of steps or intervals. Because a large harmonic noise signal is generated at the stepping frequency, the chosen number of steps, N, must be sufficiently large that the lowest frequency times N must be greater than twice the highest frequency that is to be generated. This relationship permits the harmonic noise at the stepping frequency to be attenuated by a low pass filter. The attenuation capability increases with N and it is therefore desirable that N actually be substantially greater than the minimum.

In the present example, low group tones and high group tones are independently generated and can therefore be separately filtered, although two separate low pass filters would be required where only one would be required if the signals are combined before filtering as in the systems shown in FIGS. 1-3. For the low group standard DTMF tones, the highest frequency is 946 Hz and the lowest frequency is 698 Hz. It is therefore necessary that N be greater than $2 \times 946/698 = 2.6$. Similarly, for separate filtering of the high group, N must be greater than $2 \times 1638/1217 = 2.7$. If the low group and high group DTMF signals are to be combined for filtering, then N must be greater than $2 \times 1638$ divided by $698 = 4.7$. In the present example, the number of steps has been selected to be 16. Actual tests showed that with N selected to be 16, the greatest haromonic noise occurred at the 14th and 16th harmonics. All lower harmonics were at least 45 DB below the magnitude of the fundamental sine wave frequency. The 14th harmonic was down 26 DB and the 16th harmonic was down approximately 28 DB. With a simple single pole RC filter, the 14th harmonic was reduced to approximately 45 DB below the fundamental and the 16th harmonic was reduced to approximately 48 DB below the fundamental. In each case, the lower frequency haromonics were below the 14th harmonic in magnitude.

Having selected the stepping frequency to be 16 times the fundamental output tone frequency, the problem arises of selecting a master clock frequency from which all of the output tone frequencies can be derived. Because a master clock frequency can practically be divided only by an integral number to provide the tone stepping frequencies, it is unlikely that a master clock frequency can be found that is an integral multiple of all of the tone stepping frequencies, except at an extremely high frequency that would be impractical to implement as an integrated circuit. However, the higher the master clock frequency, the smaller will be the percentage error in the fundamental output tone frequencies.

In the present example, a master clock frequency of 170.3 KHz has been selected. To generate the highest DTMF frequency stepping signal from this master clock frequency, it is necessary to divide the master clock frequency by a number $M = 170,300/1638 \times 16 = 6.53$. However, since the master clock frequency can be divided only by an integral number, the master clock frequency must be divided by either 6 or 7. If divided by 7, the actual fundamental frequency turns out to be 1520.5 for an error of 7.23%. On the other hand, if the diviser is selected to be 6, the fundamental frequency turns out to be 1773.96 Hz for an error of 8.3%. While this error can be reduced by increasing the master clock signal, such an increase will place constraints on the method of manufacture and yield of the frequency synthesizer 330 and entire digital encoder 14.

However, this error may be reduced in accordance with the invention by utilizing an intermediate frequency which is an integral submultiple of the stepping frequency and also an integral submultiple of the master clock frequency. For example, an intermediate frequency of ¼ the stepping frequency or four times the fundamental output tone frequency has been selected for frequency synthesizer 330. For the highest tone of the high group, the intermediate frequency is therefore $4 \times 1638 = 6552$ Hz. Dividing the master clock frequency by the intermediate frequency produces a required diviser of $M = 25.99$ for zero error. Rounding this off to $M = 26$ produces negligible error in the actual DTMF output tone fundamental frequency.

However, the intermediate frequency is now derived by sequencing the programmable counter 350 through 26 different sequential count states. Because the intermediate frequency is only one-fourth of the stepping frequency, these 26 count states must be further subdivided to provide four pulses on signal STEP INCREMENT H for each cycle of the 26 count states. Since the 26 count states are not integrally divisible by the number 4, the stepping pulses on signal STEP INCREMENT H cannot occur at exactly uniform periods. However, four stepping pulses can be derived for each 26 step sequence by alternately generating a stepping pulse after six count states and then seven count states. These unequal periods will result in some harmonic distortion of the fundamental sine wave signal, but each ¼ sine wave period or 90° of phase repeatedly corresponds to exactly ¼ of the period of the actual output sine wave tone signal. Therefore, the noise from harmonic distortion is of relatively small magnitude and was found to be down more than 26 DB from the fundamental even without filtering. Furthermore, the worst case occurred with the 14the harmonic so that a single pole permitted the distortion to be reduced to more than 45 DB below the magnitude of the fundamental frequency signal.

In the absence of a tone command latch input signal, the feedback matrix 340 is connected to provide an output signal to register 338 input D1 of logiv 1 when shift register 338 contains all 0's or when $Q5 \times Q6 = 1$. This arrangement causes the programmable counter 336 to sequence repeatedly through 63 different count states in the absence of a low tone command input signal from latch 158. However, in the event that one of the signals TCL1–TCL4 goes true, feedback matrix 340 provides an output signal which causes some of the sequencing states to be skipped to provide an actual integral number of sequence states M to proide a desired intermediate frequency for a selected tone frequency. In the present example, $M = 45$ for tone $L4 = 946$ Hz; $M = 50$ for tone $L3 = 851$ Hz; $M = 55$ for tone $L2 = 774$ Hz; and $M = 61$ for tone $L1 = 698$ Hz. The actual tone signals L1–L4 have been given as the standard tone signal frequencies and it will be appreciated that the frequencies of the signals actually generated will vary high an acceptable amount from standard frequencies. The required sequences are obtained by generating input signal D1 to shift register 338 with the logic function

LOW GROUP $D1 = \overline{Q1} \cdot \overline{Q2} \cdot \overline{Q3} \cdot \overline{Q4} \cdot \overline{Q5} \cdot \overline{Q6} +$ $L1 \cdot Q1 \cdot \overline{Q2} \cdot Q3 \cdot \overline{Q4} \cdot Q5 \cdot Q6 +$ $L3 \cdot \overline{Q1} \cdot Q2 \cdot Q3 \cdot Q4 \cdot \overline{Q5} \cdot \overline{Q6} +$ $L4 \cdot Q1 \cdot Q2 \cdot \overline{Q3} \cdot Q4 \cdot \overline{Q5} \cdot \overline{Q6} +$ $L2 \cdot \overline{Q1} \cdot \overline{Q2} \cdot Q3 \cdot \overline{Q4} \cdot \overline{Q5} \cdot \overline{Q6} \cdot \overline{Q5} \cdot \overline{Q6} \cdot \overline{Q5} \cdot \overline{Q6}$ Similarly, signal STEP INCREMENT L is derived by detecting different count states depending upon the commanded low group tone frequency and has the logic function

STEP INCREMENT L =

Figure 11:
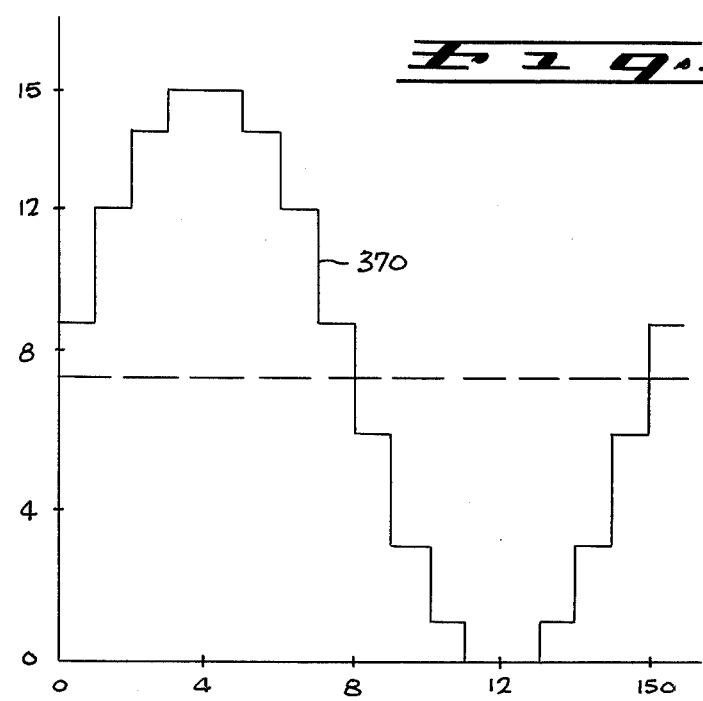
FIG. 11 is an illustration of the manner in which a waveform may be synthesized by the frequency synthesizer shown in FIG. 10.

$L1 \cdot \overline{02} \cdot (Q1 \cdot \overline{Q2} \cdot Q3 \cdot Q4 \cdot Q5 \cdot Q6 +$ $+ Q1 \cdot Q2 \cdot \overline{Q3} \cdot Q4 \cdot \overline{Q5} \cdot \overline{Q6}$ $+ Q1 \cdot \overline{Q2} \cdot Q3 \cdot \overline{Q4} \cdot Q5 \cdot Q6$ $+ Q1 \cdot \overline{Q2} \cdot \overline{Q3} \cdot \overline{Q4} \cdot \overline{Q5} \cdot Q6) +$ $L2 \cdot \overline{02} \cdot (Q1 \cdot \overline{Q2} \cdot \overline{Q3} \cdot \overline{Q4} \cdot \overline{Q5} \cdot \overline{Q6}$ $+ \overline{Q1} \cdot \overline{Q2} \cdot Q3 \cdot \overline{Q4} \cdot Q5 \cdot \overline{Q6}$ $+ Q1 \cdot Q2 \cdot \overline{Q3} \cdot Q4 \cdot \overline{Q5} \cdot \overline{Q6}$ $+ \overline{Q1} \cdot Q2 \cdot \overline{Q3} \cdot Q4 \cdot Q5 \cdot \overline{Q6} +$ $L3 \cdot 02 \cdot (\overline{Q1} \cdot \overline{Q2} \cdot Q3 \cdot \overline{Q4} \cdot \overline{Q5} \cdot \overline{Q6}$ $+ \overline{Q1} \cdot \overline{Q2} \cdot Q3 \cdot \overline{Q4} \cdot Q5 \cdot \overline{Q6}$ $+ \overline{Q1} \cdot Q2 \cdot \overline{Q3} \cdot Q4 \cdot \overline{Q5} \cdot \overline{Q6}$ $+ Q1 \cdot \overline{Q2} \cdot Q3 \cdot \overline{Q4} \cdot Q5 \cdot \overline{Q6}) +$ $L4 \cdot 02 \cdot (\overline{Q1} \cdot \overline{Q2} \cdot Q3 \cdot \overline{Q4} \cdot \overline{Q5} \cdot \overline{Q6}$ $+ \overline{Q1} \cdot Q2 \cdot \overline{Q3} \cdot Q4 \cdot \overline{Q5} \cdot \overline{Q6}$ $+ Q1 \cdot \overline{Q2} \cdot \overline{Q3} \cdot Q4 \cdot Q5 \cdot \overline{Q6}$ $+ Q1 \cdot Q2 \cdot \overline{Q3} \cdot Q4 \cdot \overline{Q5} \cdot \overline{Q6})$ Four bit binary counter 342 is incremented for each pulse on signal STEP INCREMENT L and repeatedly cycles through 16 count states, 0–15, as indicated on the horizontal axis for synthesized sine wave signal waveform 370 as shown in FIG. 11. Code translator 344 responds to four bit count signals from binary counter 342 to provide a four bit binary coded output signal that indicates a desired instantaneous magnitude for the synthesized sine wave signal waveform 370 for each count state. For example, code translator 344 provides a digital output of 9 for count states 0 and 7, an output of 12 for count states 1 and 6, an output for 14 four count states 3 and 5, and an output of 15 for count states 3 and 4. The remaining portion of the sine wve output signal waveform 370 is a mirror image of the first portion with code translator 344 providing a digital output of 6 for count states 8 and 15, 3 for count states 9 and 14, 1 for count states 10 and 13, and 0 for count states 11 ad 12. It will be appreciated that by changing the correlation between count state inputs and magnitude outputs for code translator 344, any desired periodic waveform may be generated and synthesizer 330 need not be limited to the generation of sine waves.

Programmable counter 350 operates in a manner similar to programmable counter 336 except that different intermediate frequencies are utilized to provide the different high tone group of DTMF output signals and clock signal step increment H is generated in response to different count states. The D1 input to shift register 352 has the logical function

HIGH GROUP $D1 = \overline{Q1} \cdot \overline{Q2} \cdot \overline{Q3} \cdot \overline{Q4} \cdot \overline{Q5} \cdot \overline{Q6} +$ $H4 \cdot Q1 \cdot Q2 \cdot \overline{Q3} \cdot \overline{Q4} \cdot \overline{Q5} \cdot \overline{Q6} +$ $H1 \cdot \overline{Q1} \cdot Q2 \cdot \overline{Q3} \cdot Q4 \cdot Q5 \cdot Q6$ $H3 \cdot \overline{Q1} \cdot Q2 \cdot Q3 \cdot \overline{Q4} \cdot \overline{Q5} \cdot Q6$ $H2 \cdot \overline{Q1} \cdot \overline{Q2} \cdot Q3 \cdot Q4 \cdot \overline{Q5} \cdot \overline{Q6} \cdot \overline{Q5} \cdot \overline{Q6} \cdot \overline{Q5} \cdot \overline{Q6}$ This provides count sequence states of M = 26 for 1638 Hz tone H4, 29 for 1468 Hz tone H3, 32 for 1330 Hz tone H2 and 35 for 1217 Hz tone H1.

Similarly, the clock signal, STEP INCREMENT H, has the function

STEP INCREMENT H =

$H1 \cdot \overline{02} \cdot (\overline{Q1} \cdot \overline{Q2} \cdot \overline{Q3} \cdot \overline{Q4} \cdot Q5 \cdot \overline{Q6}$ $+ Q1 \cdot \overline{Q2} \cdot Q3 \cdot \overline{Q4} \cdot \overline{Q5} \cdot \overline{Q6}$ $+ \overline{Q1} \cdot Q2 \cdot \overline{Q3} \cdot Q4 \cdot Q5 \cdot Q6$ $+ \overline{Q1} \cdot Q2 \cdot Q3 \cdot Q4 \cdot Q5 \cdot Q6) +$ $H2 \cdot \overline{02} \cdot (\overline{Q1} \cdot \overline{Q2} \cdot \overline{Q3} \cdot \overline{Q4} \cdot Q5 \cdot \overline{Q6}$ $+ Q1 \cdot \overline{Q2} \cdot Q3 \cdot \overline{Q4} \cdot \overline{Q5} \cdot \overline{Q6}$ $+ Q1 \cdot \overline{Q2} \cdot Q3 \cdot Q4 \cdot Q5 \cdot Q6$ $+ \overline{Q1} \cdot \overline{Q2} \cdot Q3 \cdot Q4 \cdot Q5 \cdot \overline{Q6})$ $H3 \cdot \overline{02} \cdot (Q1 \cdot \overline{Q2} \cdot \overline{Q3} \cdot \overline{Q4} \cdot \overline{Q5} \cdot \overline{Q6}$ $+ Q1 \cdot Q2 \cdot \overline{Q3} \cdot \overline{Q4} \cdot \overline{Q5} \cdot Q6$ $+ Q1 \cdot \overline{Q2} \cdot \overline{Q3} \cdot Q4 \cdot Q5 \cdot \overline{Q6}$ $+ \overline{Q1} \cdot \overline{Q2} \cdot Q3 \cdot Q4 \cdot \overline{Q5} \cdot Q6) +$ $H4 \cdot \overline{02} \cdot (Q1 \cdot \overline{Q2} \cdot \overline{Q3} \cdot \overline{Q4} \cdot \overline{Q5} \cdot Q6$ $+ Q1 \cdot \overline{Q2} \cdot Q3 \cdot \overline{Q4} \cdot \overline{Q5} \cdot \overline{Q6}$ -continued $$Q1 \cdot Q2 \cdot Q3 \cdot Q4 \cdot \overline{Q5} \cdot \overline{Q6}$$

$$\overline{Q1} \cdot \overline{Q2} \cdot \overline{Q3} \cdot \overline{Q4} \cdot \overline{Q5} \cdot Q6)$$

Figure 12:
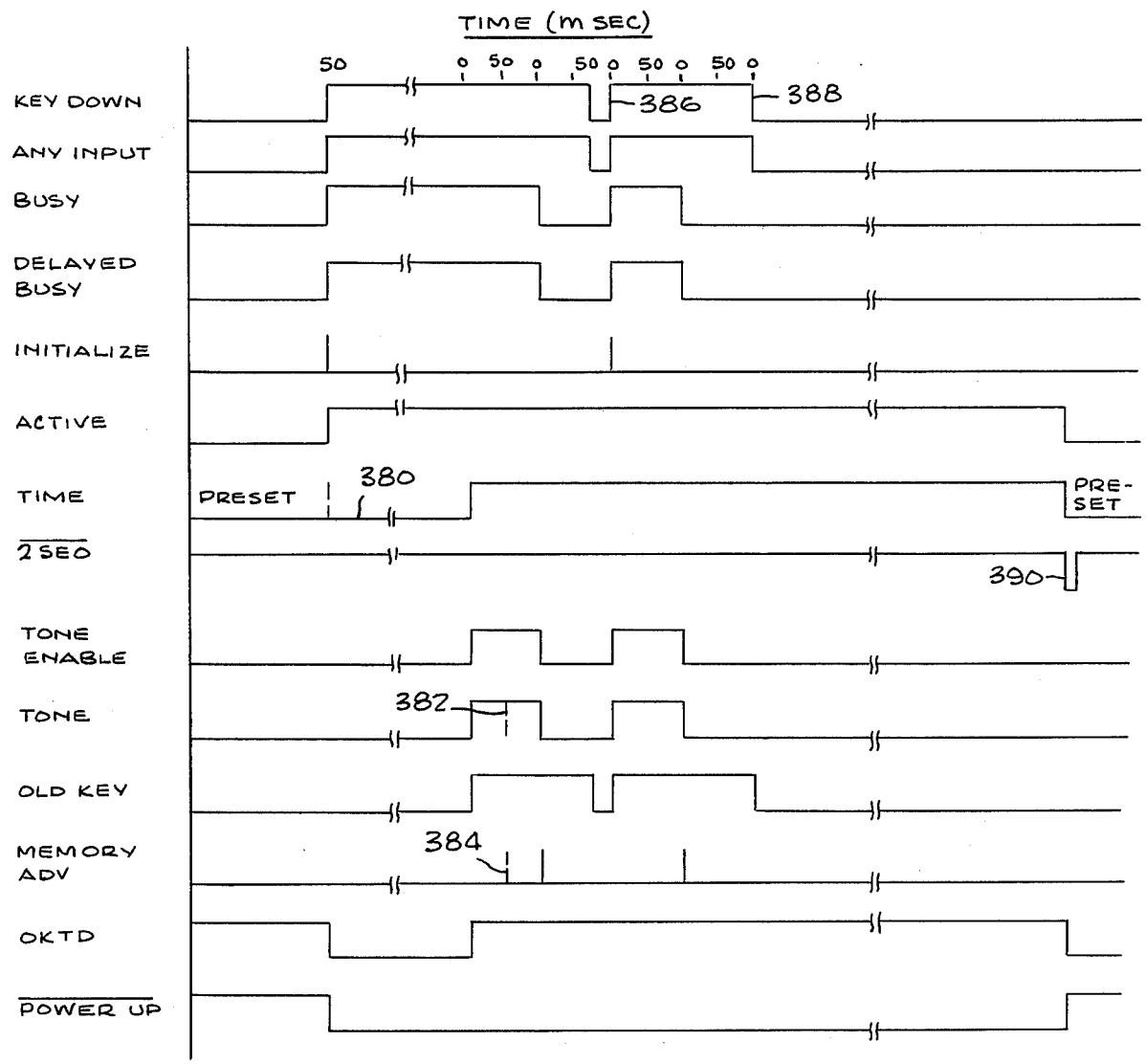
FIG. 12 is a timing diagram that is useful in understanding the operation of the DTMF encoder system shown in FIG. 1.

The operation of the DTMF telephone encoder system 10 as shown in FIG. 1 may be better understood with reference to FIG. 12. As indicated at the top of the drawing, in the absence of a key input, the sync time counter 262 continues to sequence through states 0–9 at 10 msec intervals. If at some arbitrary time a key 36 is actuated on keyboard 12, signals ANY INPUT, BUSY, and ACTIVE immediately go high and signal $\overline{\text{POWER UP}}$ goes low to turn on transistor 32 and transform digital encoder 14 from a standby mode to a full power mode. Signal BUSY causes a 0.1 msec INITIALIZE signal to be generated which resets the sync time counter until signal DELAYED BUSY goes true. Six bit counter 272, which has previously been preset to a 2's complement negative number as indicated by inputs A, B, and C then begins counting toward 0 during the predial delay interval 380. In the system 10 the predial delay interval is selected to be 0, but in general it may be any of a number of different 0.1 second count intervals. At the end of the predial delay interval 380, signal TIME goes high during sync time 9 to enable the D input to tone enable flip-flop 288 to cause signal TONE ENABLE to go high when the flip-flop 288 is clocked at the following sync time 1. The 10 msec duration of sync time 0 thus assures an adequate key input debounce time even if there is no predial delay. Immediately upon generation of signal TONE ENABLE, the TONE SIGNAL is generated causing signal OKTD to be generated and causing signal $\overline{\text{TONE ON}}$ to set the decoded key input into latches 158 and 160. (FIG. 4).

The signal TONE lasts for a duration of at least 40 msec through sync time 4 as indicated by dashed line 382 and because input $\overline{\text{90 MS}}$ has been selected, terminates 90 milliseconds later at the end of sync time 9 if the key remains actuated for at least that long. If input $\overline{\text{90 MS}}$ had not been selected, signal tone would remain active until a key release or key rollover causes termination of signal ANY INPUT. During sync time 9, a 10 msec memory advance pulse is generated. If the input terminal $20/\overline{10}$ had been selected, the memory advance pulse would have been generated a half millisecond after the start of sync time 5 as indicated by dashed line 384.

Upon termination of signal TONE for whichever reason, the busy flip-flop 284 is clocked to a reset state to terminate the signal BUSY. This signal drives the output signal ANY DATA which is coupled to then turn on LED 50 to indicate to the keyboard user that a new key may be actuated. 0.1 msec after termination of signal BUSY, the DELAYED BUSY signal terminates and the tone enable flip-flop 288 is reset when it is clocked at sync time 1 immediately following termination of the TONE signal. This resetting of the tone enable flip-flop 288 inhibits further generation of signal TONE which would otherwise be generated during sync times 1–9. Upon release of a keyboard key and termination of signal KEY DOWN and signal ANY INPUT, old key latch 286 becomes reset to enable digital encoder 14 to respond to a new key actuation as indicated at 386. As with the preceding key actuation, the BUSY signal is immediately generated and signal INITIALIZE is generated during the 0.1 msec delay between signal BUSY and signal DELAYED BUSY. The operating sequence for the first key actuation is then repeated and is repeated for each additional key actuation until a last key actuation is terminated at time 388. Two seconds after time 388 at a time 390, a 10 msec pulse occurs on signal $\overline{\text{2 SEC}}$. This signal causes the resetting of active latch 274 which in turn causes digital encoder 14 output signal $\overline{\text{2 SEC RLS}}$ to be generated and causes counter 272 to again become preset. Termination of signal ACTIVE also causes the resetting power-up latch 202 and a return of digital encoder 14 to a standby condition.

Figure 13:
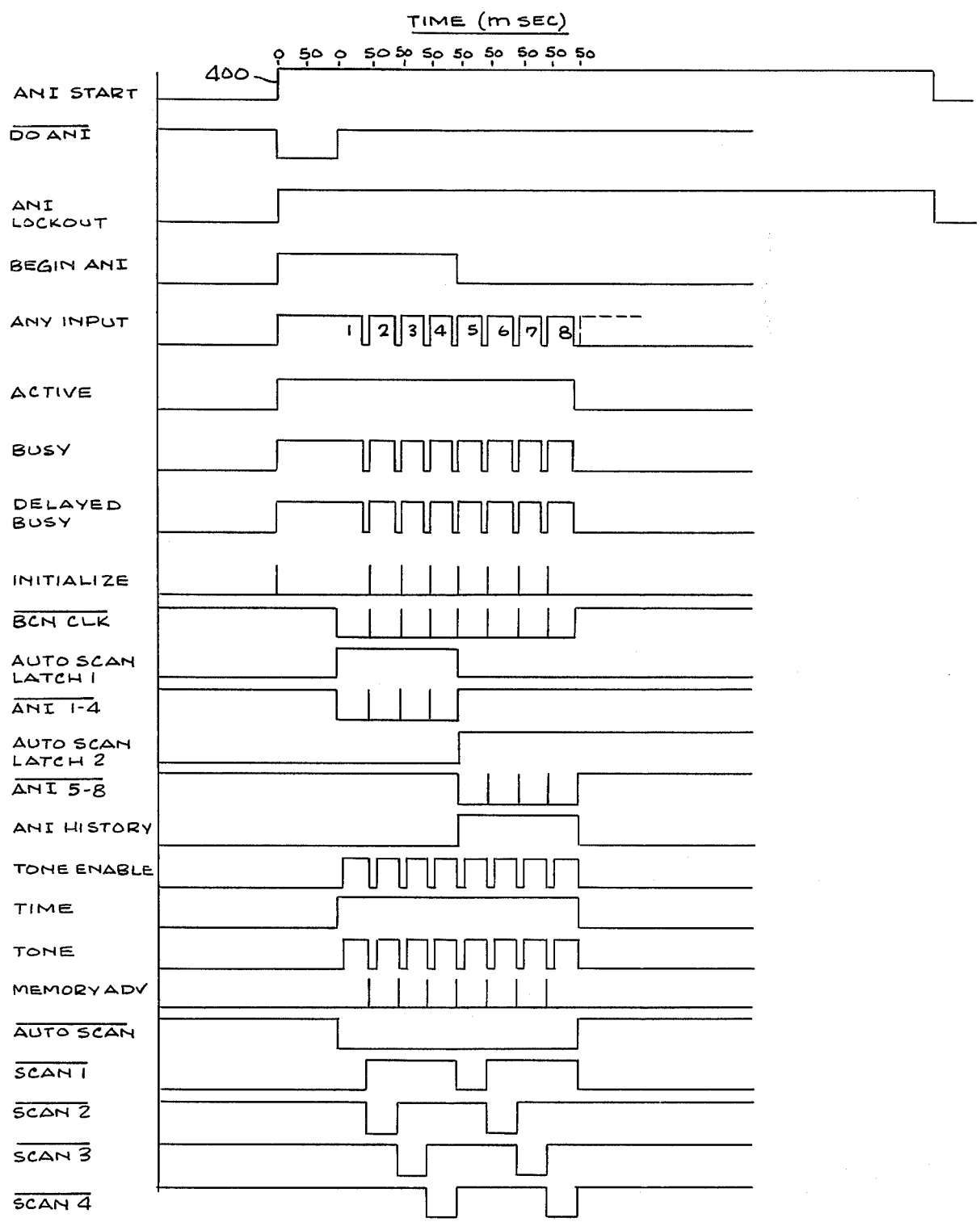
FIG. 13 is a timing diagram that is useful in understanding the operation of the transmit encoder shown in FIG. 2; and, FIG. 14 is a timing diagram that is useful in understanding the operation of the DTMF data communication system shown in FIG. 3.

A better understanding of the DTMF radio transmit encoder with automatic number insertion 60 as shown in FIG. 2 may be had with reference to the timing diagrams of FIG. 13. FIG. 13 shows the 10 msec sync time intervals across the top. The sync time counter 262 recycles and is frequently reset to these times are not continuous. Actuation of either a keyboard key or push-to-talk button 92 enables the output of NAND gate 102 to generate an input signal at input ANI START as indicated at time 400 in FIG. 13. Signal ANI start sets DO ANI flip-flop 280 whose output sets ANI lockout flip-flop 282, causes generation of signal ANY INPUT and sets beging ANI latch 304. Signal ANY INPUT sets busy flip-flop 284 to cause the delayed busy and initialize sequence and signal ACTIVE releases 6 bit counter 272 from its preset state to enable it to begin counting out the predial delay, which in the present example is 0.1 second as defined by one cycle of sync time counter 262. Thus, at sync time 9, which begins 90 msec after time 400, counter 272 generates signal TIME which in turn enables the setting of auto scan latch 1 308. Setting of auto scan latch 1 308 enables the generation of signal $\overline{\text{AUTO SCAN}}$ by NOR gate 316 the setting of AUTO SCAN latch 1 also fully enables NAND gate 314 to generate an active low ANI 1–4 output which is connected to address word 1 of read only memory 62 and to actuate clock input signal $\overline{\text{BCN}}$. This insures that signal ANY INPUT remains high to insure the setting of tone enable flip-flop 288 and the generation of signal TONE at the end of the predial delay.

Because a 20 character per second rate has been selected, at sync time 5 a MEMORY ADV pulse is generated. This MEMORY ADV pulse causes a short interruption in output $\overline{\text{ANI 1–4}}$ and advances counter 302 to enable signal $\overline{\text{SCAN 2}}$ and disable signal $\overline{\text{SCAN 1}}$. The signal TIME at the end of the predial delay resets DO ANI flip-flop 280 to terminate signal ANY INPUT and thus cause signal TONE to terminate and reset the tone enable clock 288 at the end of sync time 4 after generating a 40 msec DTMF tone pulse.

However, as the short MEMORY ADV pulse returns to logic 0, output $\overline{\text{ANI 1–4}}$ is again enabled to again address ROM 62 with the data signals for digit 1 on input lines 5–8 now enabled by signal $\overline{\text{SCAN 2}}$ and the combination of the auto scan signal and signal BCN CK causes activation of signal ANY INPUT. A new tone generation sequence for digit 2 is then begun.

Digital encoder 14 thus continues to sequence in a similar manner through digits 1, 2, 3 and 4. The MEMORY ADV pulse which occurs at the termination of the tone signal for digit 4 causes sequencer 302 to recycle with signal SCAN 1 again being generated. This signal clocks auto scan latch 2 310 causing it to set with the output thereof resetting auto scan latch 1 308, setting ANI history latch 306, and enabling output signal $\overline{\text{ANI}}$ 5-8. The ANI circuit then continues to sequence through digits 5-8 in a similar manner with signal $\overline{\text{SCAN 1}}$-$\overline{\text{SCAN 4}}$ being sequentially activated while word 2 of ROM 62 is addressed. At the termination of the tone for digit 8, if the start ANI sequence was initiated by the push-to-talk button 92 on microphone 90, signal ACTIVE will immediately go low to terminate further operation of digital encoder 14. To prevent any further ANI, the ANI lockout flip-flop 282 remains set until the release of push-to-talk button 92 terminates the ANI start input command and thereby enables the reset of ANI lockout flip-flop 282.

In the event that the ANI operation was initiated by a key actuation, the output signal $\overline{\text{2 SEC RLS}}$, which is responsive to the ACTIVE signal, remains active to prevent resetting of ANI lockout flip-flop 282 and prevent further ANI operations during a keyboard entry cycle which may be substantially the same as described in conjunction with FIG. 12. In the event that the ANI cycle was initiated by a key actuation, the portion "AUTO SCAN · BCN · $\overline{\text{KEY DOWN}}$ · $\overline{\text{WNOK}}$" of the logic function for signal ANY INPUT causes this signal to then be activated to permit the generation of tones corresponding to key actuations.

Figure 14:
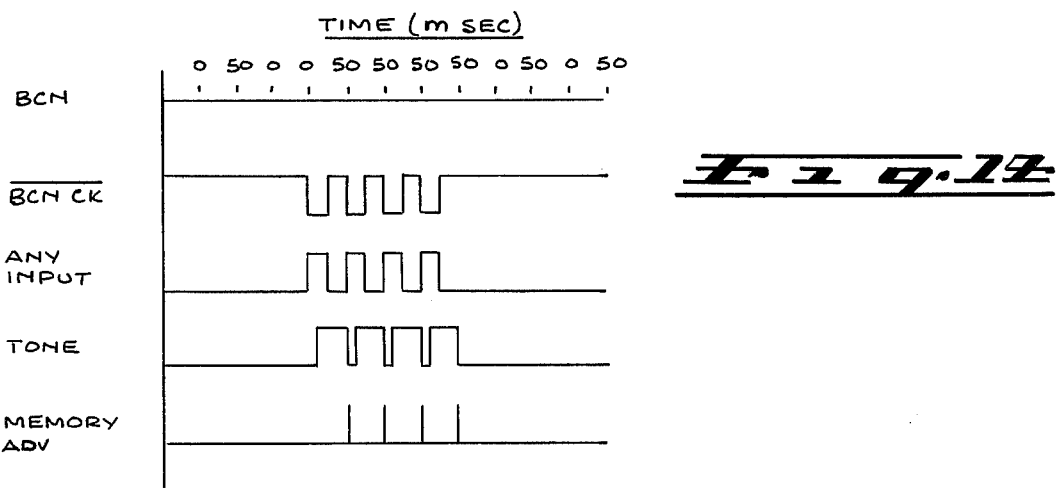

A further understanding of the DTMF data communications system 120 as shown in FIG. 3 may be had with reference to FIG. 14. When data unit 122 activates signal $\overline{\text{BCN CK}}$ while signal BCN is high, signal ANY INNPUT goes high to generate a tone output sequence as described in conjunction with FIG. 11. The only difference in the tone output sequence is that the activation of input BCN causes input decoder circuit 140 to enable gate 174 and gate 166 to cause data input conductors $\overline{13}$-$\overline{16}$ to be decoded as a binary coded number to generate the high and low group tone command signals. Because the 20/$\overline{10}$ input is connected to +V for the encoder 60, each tone signal will terminate and a MEMORY ADV signal will be generated at the end of sync time 4 or approximately 50 msec after actuation of signal BCN and ANY INPUT. The MEMORY ADV signal drives output signal INTERDIGIT PULSE which is communicated back through data unit 122 to enable it to immediately place new information on the binary coded data input line $\overline{13}$-$\overline{16}$ and generate a new clock signal $\overline{\text{BCN CK}}$ to enable a new set of tones to be generated for the new data. Since the sync time counter 262 is reset at the beginning of each new tone signal after a preceding 50 msec tone signal, the time scale at the top of FIG. 14 indicates this mode of operation by repeatedly showing the 50 msec time at the end of each DTMF pulse transmission. It will be appreciated that the counter 262 is then reset at time 50 by the initiation of signal ANY INPUT even though the reset time 0 is not explicitly shown.

While there have been described above various arrangements of multiple frequency data communication systems in accordance with the invention, for the purpose of enabling a person of ordinary skill in the art to make and use the invention, it will be appreciated that the invention is not limited thereto. Accordingly, any modifications, variations, or equivalent arrangements within the scope of the attached claims should be considered to be within the scope of the invention.

What is claimed is:

1. A dual tone multiple frequency encoder system comprising:

a keyboard providing data signals indicative of actuated keys;

a data store providing data signals indicative of data characters when addressed;

an encoder circuit coupled to receive sequential data signals from the keyboard and the data store and for each data signal to generate a dual tone multiple frequency signal indicative thereof;

an automatic number insertion circuit coupled to be operative upon receipt of a start signal to sequentially address the data store to generate a plurality of sequential data characters and to inhibit response of the encoder circuit to keyboard data signals only until after said plurality of sequential data characters from the data store have been generated and encoded as dual tone multiple frequency signals;

a start signal circuit coupled to generate a start signal in response to a keyboard key actuation.

2. The encoder system according to claim 1 above, wherein the start signal circuit is further coupled to generate a start signal in response to an external command.

3. The encoder system according to claim 1 above, further comprising means for coupling dual tone multiple frequency signals from the encoder circuit to a telephone network for transmission thereover.

4. The encoder system according to claim 2 above, further comprising a radio transceiver coupled to transmit radio signals carrying dual tone multiple frequency signals generated by the encoder system.

5. The encoder system according to claim 4 above, wherein the transceiver further includes an audio microphone and a push to talk switch coupled to enable the microphone when actuated, and further comprising a circuitry coupled to provide an external command to the start signal circuit in response to actuation of the push to talk switch.

6. The encoder system according to claim 1 above, further comprising a timing circuit coupled to generate a signal 2 SEC RLS which becomes active upon detection of a data signal and which remains active for a period of time following termination of a last data signal.

7. The encoder system according to claim 6 above, wherein the start signal circuit is coupled to generate a start signal only in response to a keyboard key actuation that occurs in the absence of an active 2 SEC RLS signal.

8. The encoder system according to claim 1 above, further comprising a wait circuit coupled to inhibit the generation of keyboard data signals while the automatic number insertion circuit is operative to address the data store.

9. The encoder system according to claim 1 above, further comprising a timing circuit coupled to provide a predial delay by inhibiting response of the encoder system to a first keyboard data signal following a release time period until after a predial period of time has passed.

10. The system according to claim 9 above, wherein the timing circuit is coupled to selectively determine the predial period of time in response to at least one predial delay selection signal.

11. The system according to claim 10 above, wherein one of the selectable predial periods of time is zero.

12. The system according to claim 11 above, wherein one of the selectable predial periods is infinite.

13. The encoder system according to claim 1 above, wherein said encoder circuit includes first and second digital waveform synthesizers digitally generating first and second sinewave signals respectively with different frequencies, said first and second sinewave signals being combined to form said output signal.

14. The encoder system according to claim 13 above, wherein each of said first and second digital frequency synthesizers includes (1) a digital sequencer connected to provide digital output information which indicates a sinewave magnitude at each of a number of successive discrete sinewave phase angles which are approximately equally spaced throughout a sinewave period, said sinewave phase angles for which a magnitude is indicated being incremented in response to a succession of clock pulses; (2) a digital to analog converter connected to provide a signal magnitude indicative of said digital output information; and (3) a clock pulse generator connected to respond to said keyboard information by generating a sequence of periodic clock pulses at a frequency equal to an output frequency indicated by said keyboard information multiplied by the number of successive discrete phase angles which are spaced throughout a sinewave period.

15. The encoder system according to claim 1 above, further comprising a power supply circuit that is connectable to provide the encoder system with all electrical operating power requirements thereof in response to electrical power received from a standard utility telephone system connection.

16. The encoder system according to claim 1 above, wherein said encoder circuit includes a first circuit portion having a first power supply input continually coupled to a power supply circuit, a second circuit portion having a second power supply input different from the first, the first circuit portion being operable to generate a power up signal in response to the receipt of keyboard information, and the communication system further comprising means for switching coupled to provide electrical power from the power supply circuit to the second power supply input in response to the power up signal, said second circuit portion consuming no power in the absence of a power up signal.

17. The encoder system according to claim 1 above, wherein said encoder circuit includes means for insuring that tones generated thereby have a predetermined minimum time duration.

18. The encoder system according to claim 17 above, wherein the minimum time duration is 40 milliseconds.

19. The encoder system according to claim 1 above, wherein said encoder circuit includes means responsive to a time limiting signal for limiting tone generation time for any one data signal to a maximum time duration when the time limit signal is active.

20. The encoder system according to claim 19 above, wherein the maximum time duration is 90 milliseconds.

21. The encoder system according to claim 1 above, wherein the encoder circuit includes means for generating an interdigit pulse signal upon completion of the generation of a dual tone multiple frequency signal for each data signal, the interdigit pulse signal being provided as an output signal and also being coupled to the automatic number insertion circuit to command sequencing to a new data character.

22. The encoder system according to claim 1 above, further comprising 16 data input conductors operatively connected to the keyboard and to the data store to receive data signals therefrom and an input decode circuit coupling the data input conductors to the encoder circuit, the input decode circuit being responsive to data format selection signals to convert data signals received by the input conductors from a selected one of a plurality of data formats to a two of eight format.

23. The encoder system according to claim 22 above, wherein the input decode circuit responds to a two of eight data format selection signal by coupling eight of the input conductors directly to the encoder circuit with no code translation.

24. The encoder system according to claim 22 above, wherein the input decode circuit responds to a one of 16 data format selection signal by converting a one of 16 input signal on the input conductors to a two of eight signal.

25. The encoder system according to claim 22 above, wherein the input decode circuit responds to a binary coded number data format selection signal by converting a binary coded number on four of the 16 input conductors to a two of eight signal.

26. The encoder system according to claim 25 above, wherein the input decode circuit includes a 16:4 multiplexer coupled to provide signals on a selected four of the 16 input conductors for conversion to a two of eight code format.

27. The encoder system according to claim 22 above, further comprising a wrong number of keys detection circuit coupled to generate a wrong number of keys error signal if more than one signal appears on a first group of four conductors coupled to the encoder circuit, if more than one signal appears on a second group of four conductors different from the first group connected to the encoder circuit, or if while a two of eight input data format selection signal is active, a signal does not appear on at least one of a first group of four data input conductors and at least one of a second group of four data input conductors different from the first group.

28. The encoder system according to claim 1 above, further comprising 16 data input conductors operatively coupled to the keyboard and to the data store to receive data signals thereon, and an input decode circuit coupling the data input conductors to the encoder circuit, the input decode circuit including a first gate circuit coupling eight data input conductors to eight data inputs respectively for the encoder circuit only when a two of eight data input format selection signal is active.

29. The encoder system according to claim 28 above, wherein the input decode circuit further includes a 16 to two of eight encoder having 16 input conductors coupled to the 16 data input conductors and eight output conductors and a second gate circuit coupling the eight output conductors of the 16 to two of eight encoder to the eight data inputs respectively for the encoder circuit only when a two of eight data input format selection signal is not active.

30. The encoder system according to claim 29 above, further comprising a third gate coupling the 16 data input conductors to the 16 input conductors of the 16 to two of eight encoder only when a one of 16 input format selection signal is active; a 16:4 multiplexer coupled to output signals appearing on one group of four groups of four data input conductors each selected in response to scan signals provided by the automatic number insertion circuit; a 4:16 decode matrix coupled to provide one of sixteen signals on 16 output conductors thereof in response to signals output by the multiplexer; and a fourth gate coupling the sixteen output conductors of the 4:16 decode matrix to the sixteen input conductors of the 16 to two of eight decoder only when a binary coded number input format selection signal is active, and wherein the automatic number insertion circuit includes means for generating scan signals which command that the four groups of four data input conductors be sequentially coupled to the output of the multiplexer in response to a start signal and to generate a binary coded number input format selection signal in response to a start signal.

31. The encoder system according to claim 30 above, wherein the automatic number insertion circuit generates a first address signal as a first group of four characters are encoded by the system and a second address signal as a second group of four characters are encoded by the system and wherein the data store is coupled to provide a first group of four, four bit binary coded data signals to the 16 input conductors in response to a first address signal and a second group of four, four bit binary coded data signals to the 16 input conductors in response to a second address signal.

32. A dual tone multiple frequency communication sytem comprising
- a switch coupling the system to a telephone network;
- a microphone coupled to transmit voice frequency signals over a telephone network in response to audible voice frequency signals;
- a speaker coupled to generate audible voice frequency signals in response to voice frequency signals received over a telephone network;
- a keyboard providing data signals in response to the actuation of keys thereon;
- a digital encoder circuit coupled to receive the data signals from the keyboard and to transmit over a telephone network dual tone multiple frequency signals indicative of actuated keys, the digital encoder circuit including means for generating a first signal when a dual tone multiple frequency signal is being generated and means for generating a second signal when a dual tone multiple frequency singal is being generated and for a period of time thereafter;
- a muting circuit coupled to reduce the magnitude of audio signals from the speaker in response to a first signal; and
- a microphone circuit coupled to block signals from the microphone during the generation of a dual tone multiple frequency signal by the digital encoder circuit and for a period of time thereafter in response to the second signal.

33. The communication system according to claim 32 above, wherein the period of time during which the microphone is blocked following a dual tone multiple frequency signal is approximately 2 seconds.

34. The communication system according to claim 32 above, wherein the digital encoder circuit further includes a timing circuit coupled to provide a predial delay following actuation of a key in the absence of the second signal, the generation of dual tone multiple frequency signals being inhibited during the predial delay.

35. The communication system according to claim 34 above, wherein the digital encoder circuit includes means for selecting a time period from a plurality of selectable time periods in response to predial delay selection signals, the selectable time periods including zero and infinity.

36. The communication system according to claim 35 above, wherein a wait signal is generated during each predial delay period, the wait signal being coupled to disable the keyboard.

37. The communication system according to claim 32 above, further comprising standby and switched power inputs, the standby power input being coupled to provide power to a first portion of the communication system and the switched power input being coupled to provide power to a second portion of the communication system different from the first portion; a power supply circuit coupled to receive power from a telephone network through the switch and provide power to the standby power input when the switch is closed; a power up circuit coupled to sense actuation of a keyboard key and to generate a power up signal during actuation of the keyboard key and for a period of time thereafter; and a switch coupling power from the power supply circuit to the switched power input in response to the power up signal.

38. The communication system according to claim 37 above, wherein the power up circuit includes means for terminating the power up signal in synchronism with termination of the second signal.

39. The communication system according to claim 32 above, wherein the digital encoder circuit further includes a tone duration limit circuit coupled to respond to a tone duration limit input signal by limiting the dual tone multiple frequency signal generated for any given data signal to a predetermined time duration.

40. The communication system according to claim 39 above, wherein the predetermined time duration is greater than 40 milliseconds and less than or equal to 90 milliseconds.

41. The communication system according to claim 32 above, further comprising means for temporarily increasing the input signal.

42. The communication system according to claim 32 above, further comprising means responsive to the first signal for indicating to an operator the availability of the system to accept a new key actuation in the absence of the first signal.

43. The communication system according to claim 37 above, further comprising means responsive to the first signal and to the application of power to the switched power input for indicating to an operator the availability of the system to accept a new key actuation in the absence of the first signal while power is supplied to the switched power input.

44. The communication system according to claim 43 above, wherein said indicating means includes a light emitting diode coupled to indicate the availability of the system to accept a new key actuation when illuminated.

45. A dual tone multiple frequency communication system comprising:
- a radio transmitter coupled to transmit audio frequency signals applied to a signal input when enabled by application of an enable signal to an enable input;
- a digital encoder circuit generating dual tone multiple frequency signals in response to data input signals and generating a slow release signal that becomes active upon receipt of a data input signal and remains active for a period of time following a last data input signal, the digital encoder to control a data store and in response to a start signal;
- a data store coupled to provide data information to the digital encoder circuit under control of the automatic number insertion circuit;

a microphone generating microphone signals indicative of audible signals received thereby;

an actuatable microphone switch; and an interface circuit coupling dual tone multiple frequency signals to the transmitter signal input when generated by the digital encoder circuit, coupling microphone signals to the transmitter signal input in the absence of the slow release signal, applying an enable signal to the tramsmitter enable input in response to actuation of the microphone switch and in response to the slow release signal and generating a start signal in response to actuation of the microphone switch.

46. The communication system according to claim 45 above, further comprising a keyboard coupled to provide data signals to the digital encoder circuit in response to actuation of keys thereon and means for providing a start signal in response to the actuation of a keyboard key.

47. The communication system according to claim 46 above, wherein said means for providing a start signal is responsive to the slow release signal.

48. The communication system according to claim 45 above, wherein the automatic number insertion circuit includes means responsive to rate selection informaton for sequencing the data input signals at a selected one of a plurality of different rates.

49. The communication system according to claim 48 above, wherein said different rates include 20 data signals per second and 10 data signals per second.

50. The communication system according to claim 45 above, wherein the digital encoder circuit includes means for insuring a minimum time of 40 milliseconds for generation of each dual tone multiple frequency signal.

51. The communication system according to claim 45 above, wherein the digital encoder circuit includes means responsive to a time limit signal for limiting the duration of each dual tone multiple frequency signal to a predetermined time period.

52. The communication system according to claim 51 above, wherein the predetermined time period to which each dual tone multiple frequency signal is limited is approximately 90 milliseconds.

53. The communication system according to claim 45 above, wherein the data store is coupled to provide a first plurality of binary coded information signal groups in response to a first store enable signal and a second plurality of binary coded information signal groups in response to a second store enable signal, and wherein the automatic number insertion circuit includes means for generating a first store enable signal while scanning in sequence the first plurality of binary coded information signal groups and then providing a second store enable signal while scanning in sequence the second plurality of binary coded information signal groups.

54. The communication system according to claim 53 above, further comprising a decoder circuit coupled to convert the binary coded informaton signal groups provided by the data store to two of eight data signals to which the digital encoder circuit responds by generating dual tone multiple frequency signals indicative thereof.

55. The communication system according to claim 45 above, wherein the digital encoder circuit includes means for converting data input signals from a one of sixteen data format to a two of eight data format.

56. The communication system according to claim 45 above, wherein the data store includes a pair of diode matrices.

57. The communication system according to claim 45 above, further comprising means for providing a delay following receipt of a first of a sequence of data input signals before generating a dual tone multiple frequency signal corresponding thereto.

58. A dual tone multiple frequency communication system comprising:

a data unit coupled to provide a sequence of data signals to a digital encoder circuit in response to operator commands; and a digital encoder circuit coupled to digitally synthesize a dual tone multiple frequency signal corresponding to each data signal, the digital encoder circuit including means for generating an interdigit pulse signal that is coupled to the data unit and indicates completion of each dual tone multiple frequency signal.

59. The communication system according to claim 58 above, wherein the data signals are provided by the data unit in a binary coded format.

60. The communication system according to claim 58 above, wherein the data unit is a repertory dialer.

61. A dual tone multiple frequency communication system comprising:

means for providing data signals; and a digital encoder circuit coupled to receive the data signals and including a digital waveform synthesizer coupled to digitally synthesize dual tone sinewave signals at frequencies indicative of the data signals, each sinewave signal being synthesized for a minimum period of time notwithstanding earlier termination of a data signal for which a sinewave signal is generated.

62. The communication system according to claim 61 above, wherein the minimum period of time is 40 milliseconds.

63. The communication system according to claim 61 above, further comprising means for limiting the maximum period of time during which each sinewave signal is synthesized.

64. A dual tone multiple frequency communication system comprising:

a source of data signals; and a digital encoder circuit coupled to respond to a data signal from the source by digitally synthesizing dual tone multiple frequency sinewave signals indicative thereof, the digital encoder providing a selected time delay before commencing the synthesizing of a sinewave signal corresponding to a first of a sequence of data signals.

65. The communication system according to claim 64 above, wherein a new sequence is initiated upon receipt of a data signal by the digital encoder circuit following a release period of time during which no data signal is provided by the source.

66. The communication system according to claim 65 above, wherein the release period of time is approximately 2 seconds.

* * * * *

UNITED STATES PATENT AND TRADEMARK OFFICE
CERTIFICATE OF CORRECTION

PATENT NO. : 4,087,638
DATED : May 2, 1978
INVENTOR(S) : James Christopher Hayes et al It is certified that error appears in the above-identified patent and that said Letters Patent are hereby corrected as shown below:

Col. 5, line 19, after "number", "of" should read --or--. Col. 6, line 20, after "logic", insert --before--; line 62, "gtes" should read --gates--; line 67, "washing" should read --wishing--. Col. 9, line 31, "$\overline{2 \text{ of } 8}$" should read --2 of 8--;

line 32,

"2 of 8" should read --$\overline{2 \text{ of } 8}$--;

line 54, "durig" should read --during--; line 58, "gte" should read --gate--. Col. 10, line 46, after "four" and before "NAND", insert --inputs connected to a different data input of group 148 and a--. Col. 11, line 62, "104" should read --204--; line 67, "snown" should read --shown--. Col. 12, line 13, "$\overline{01}$ and $\overline{02}$" should read --$\overline{\emptyset 1}$ and $\overline{\emptyset 2}$--;

line 31, "$\underline{\overline{Q}}$" should read --Q--; line 31, "Q" should read --$\overline{Q}$--; line 45, "$\overline{01}$" should read --$\overline{\emptyset 1}$--; lines 45 and 46, "connecteed" should read --connected--; line 47, after "In", "th" should read --the--; line 49, "$\overline{01}$" should read --$\overline{\emptyset 1}$--. Col. 14, line 34, "250" should read --240--. Col. 15, line 56, after "ANY INPUT", insert --signal--. Col. 20, line 41, "14the" should read --14$^{th}$--; line 48, "logiv" should read --logic--; line 57, "proide" should read --provide--. Col. 21, line 22, after "L1·", "$\overline{02}$" should read --$\overline{\emptyset 2}$--; line 30, after "L2·", "$\overline{02}$" should read --$\overline{\emptyset 2}$--; line 39, after "L3·", "02" should read --$\emptyset 2$--; line 47, after "L4·", "02" should read --$\emptyset 2$--. Col. 22, line 1, "wve" should read --wave--;

UNITED STATES PATENT AND TRADEMARK OFFICE
CERTIFICATE OF CORRECTION

PATENT NO. : 4,087,638

DATED : May 2, 1978

INVENTOR(S) : James Christopher Hayes et al

It is certified that error appears in the above-identified patent and that said Letters Patent are hereby corrected as shown below:

line 5, after "11", "ad" should read --and--; line 26, after "Q6", insert --+--; line 41, after "H1·", "$\overline{02}$" should read --$\overline{\emptyset 2}$--; line 49, after "H2·", "$\overline{02}$" should read --$\overline{\emptyset 2}$--; line 57, after "H3·", "$\overline{02}$" should read --$\overline{\emptyset 2}$--; line 66, after "H4·", "$\overline{02}$" should read --$\overline{\emptyset 2}$--. Col. 23, lines 34 & 35, "SIGNAL" should read --signal--. Col. 24, line 26, "beging" should read --begin--; line 57, after "digit", "1" should read --2--. Col. 25, line 30, "INNPUT" should read --INPUT--. Col. 29, line 41, "singal" should read --signal--. Col. 30, line 36, after "the" and before "input", insert --operating rate of the communication system in response to a test--; line 64, after "encoder", insert --circuit including an automatic number insertion circuit coupled--; line 65, after "store" insert --to provide a sequence of data input signals in response to information received from the data store--.

Signed and Sealed this

Nineteenth Day of September 1978

[SEAL]

Attest:

RUTH C. MASON
Attesting Officer

DONALD W. BANNER
Commissioner of Patents and Trademarks